(12) United States Patent
Boersma et al.

(10) Patent No.: US 9,496,565 B2
(45) Date of Patent: Nov. 15, 2016

(54) ARCHITECTURES FOR ELECTROCHEMICAL SYSTEMS

(75) Inventors: Reinder J. Boersma, Webster, MA (US);
(Continued)

(73) Assignee: Acumentrics SOFC Corporation, Westwood, MA (US)

( * ) Notice: Subject to any disclaimer, the term of this patent is extended or adjusted under 35 U.S.C. 154(b) by 1283 days.

(21) Appl. No.: 12/526,008

(22) PCT Filed: Feb. 6, 2008

(86) PCT No.: PCT/US2008/001543
§ 371 (c)(1),
(2), (4) Date: Nov. 11, 2010

(87) PCT Pub. No.: WO2008/097558
PCT Pub. Date: Aug. 14, 2008

(65) Prior Publication Data
US 2011/0189556 A1  Aug. 4, 2011

Related U.S. Application Data

(60) Provisional application No. 61/275,699, filed on Mar. 29, 2007, provisional application No. 60/899,865, filed on Feb. 6, 2007.

(51) Int. Cl.
| H01M 8/06 | (2016.01) |
| C25B 1/02 | (2006.01) |
| B01J 8/00 | (2006.01) |
| C01B 3/02 | (2006.01) |

(Continued)

(52) U.S. Cl.
CPC ............ *H01M 8/04014* (2013.01); *C01B 3/34* (2013.01); *C01B 3/36* (2013.01); *C01B 3/382* (2013.01);
(Continued)

(58) Field of Classification Search
CPC ............ H01M 8/04014; H01M 8/0662; H01M 8/0631; H01M 8/0668; H01M 8/0612;
(Continued)

(56) References Cited

U.S. PATENT DOCUMENTS 3,635,812 A * 1/1972 Spacil ............................ 204/277
3,901,669 A * 8/1975 Seitzer .................. B01D 53/22
422/640

(Continued)

FOREIGN PATENT DOCUMENTS

EP 01242401 9/1989
EP 0438902 * 7/1991 .............. H01M 8/12
(Continued)

*Primary Examiner* — Ula C Ruddock
*Assistant Examiner* — Amanda Barrow
(74) *Attorney, Agent, or Firm* — Preti Flaherty Beliveau & Pachios LLP

(57) ABSTRACT

The present invention generally relates to electrochemical systems for producing hydrogen and/or power. Various aspects of the invention are directed to reactor designs for producing hydrogen and/or power from a fuel and water, conducting ceramics and other materials for such systems, including mixed ionically and electrically conducting ceramics which can be used for hydrogen gas generation, control systems for such systems, and methods of operating such systems.

49 Claims, 11 Drawing Sheets

(75) Inventors: Scott C. Rackey, Bedford, MA (US);
Jack A. Shindle, Lanfield, OH (US)

(51) Int. Cl.
*H01M 8/04* (2016.01)
*C01B 3/34* (2006.01)
*C01B 3/36* (2006.01)
*C01B 3/38* (2006.01)
*C10J 3/00* (2006.01)

(52) U.S. Cl.
CPC ............... *C10J 3/00* (2013.01); *H01M 8/0612* (2013.01); *H01M 8/0618* (2013.01); *H01M 8/0631* (2013.01); *H01M 8/0656* (2013.01); *H01M 8/0662* (2013.01); *H01M 8/0668* (2013.01); *C01B 2203/025* (2013.01); *C01B 2203/0233* (2013.01); *C01B 2203/0283* (2013.01); *C01B 2203/04* (2013.01); *C01B 2203/06* (2013.01); *C01B 2203/0883* (2013.01); *C01B 2203/1217* (2013.01); *C01B 2203/1235* (2013.01); *C01B 2203/142* (2013.01); *C01B 2203/84* (2013.01); *C10J 2300/1646* (2013.01); *C10J 2300/1684* (2013.01); *H01M 8/04089* (2013.01); *H01M 8/04119* (2013.01); *H01M 8/04291* (2013.01); *Y02E 60/364* (2013.01); *Y02E 60/50* (2013.01)

(58) Field of Classification Search
CPC .............. H01M 8/0656; H01M 8/0618; H01M 8/04119; H01M 8/04291; H01M 8/04089; C01B 3/34; C01B 3/382; C01B 3/36; C01B 2203/1235; C01B 2203/142; C01B 2203/1217; C01B 2203/06; C01B 2203/0233; C01B 2203/0283; C01B 2203/0883; C01B 2203/84; C01B 2203/04; C01B 2203/025; C01J 3/00; C01J 2300/1646; C01J 2300/1684
See application file for complete search history.

(56) References Cited

U.S. PATENT DOCUMENTS

| | | | | |
|---|---|---|---|---|
| 4,842,811 A * | 6/1989 | Desilva | .......................... | 376/301 |
| 5,229,102 A * | 7/1993 | Minet | ...................... | B01J 8/009 |
| | | | | 123/3 |
| 5,436,086 A * | 7/1995 | Seymour et al. | ............. | 429/410 |
| 5,980,840 A * | 11/1999 | Kleefisch | ............. | B01D 53/885 |
| | | | | 252/373 |
| 6,153,163 A * | 11/2000 | Prasad | ................. | B01J 19/2475 |
| | | | | 252/373 |
| 6,287,432 B1 * | 9/2001 | Mazanec et al. | ............. | 204/265 |
| 6,394,043 B1 * | 5/2002 | Bool, III | ................. | B01B 1/005 |
| | | | | 122/31.1 |
| 7,556,675 B2 * | 7/2009 | Carolan | ............... | B01J 19/2475 |
| | | | | 205/634 |
| 2002/0068206 A1 * | 6/2002 | Suzuki et al. | ................... | 429/20 |
| 2003/0223926 A1 * | 12/2003 | Edlund et al. | ................ | 422/198 |
| 2004/0043272 A1 * | 3/2004 | Gorte et al. | .................... | 429/33 |
| 2004/0057898 A1 * | 3/2004 | Singh et al. | ................ | 423/652 |
| 2004/0098997 A1 * | 5/2004 | Lee | ....................... | F25B 49/022 |
| | | | | 62/222 |
| 2004/0170874 A1 * | 9/2004 | Valensa | ................... | B01J 19/249 |
| | | | | 48/198.3 |
| 2004/0181083 A1 * | 9/2004 | Proll | ...................... | B01J 27/199 |
| | | | | 558/319 |
| 2004/0226217 A1 * | 11/2004 | Ahmed | .................... | B01J 8/025 |
| | | | | 48/127.9 |
| 2005/0096211 A1 * | 5/2005 | Takeda et al. | ................... | 502/66 |
| 2005/0196653 A1 * | 9/2005 | Haltiner et al. | ................ | 429/19 |
| 2005/0260469 A1 * | 11/2005 | Forte | ............................... | 429/20 |
| 2006/0013762 A1 * | 1/2006 | Kuipers | ................. | B01J 8/0085 |
| | | | | 423/651 |
| 2006/0048808 A1 | 3/2006 | Ruckman et al. | | |
| 2006/0204800 A1 * | 9/2006 | Kamijo | ..................... | C01B 3/48 |
| | | | | 429/412 |
| 2006/0272212 A1 * | 12/2006 | Edlund | ............... | 48/197 R |
| 2007/0000176 A1 * | 1/2007 | Liu et al. | .................... | 48/198.1 |
| 2007/0025909 A1 * | 2/2007 | Krist | .................... | B01D 53/228 |
| | | | | 423/644 |
| 2007/0264174 A1 * | 11/2007 | Willigan | ................ | B01J 23/002 |
| | | | | 422/222 |

FOREIGN PATENT DOCUMENTS

| | | | |
|---|---|---|---|
| EP | 0962423 | 6/1999 | |
| EP | 1357084 | 10/2003 | |
| WO | WO 00/22690 | 4/2000 | |
| WO | WO 03/093536 | 11/2003 | |
| WO | WO 2006/041854 | 4/2006 | |
| WO | WO 2007/042743 | * 4/2007 | ............ B01D 53/32 |

\* cited by examiner

US 9,496,565 B2

ARCHITECTURES FOR ELECTROCHEMICAL SYSTEMS

RELATED APPLICATIONS

This application claims priority to U.S. Provisional Patent Application Ser. No. 61/275,699, filed Mar. 29, 2007, entitled "Architectures for Electrochemical Systems," by Boersma, et al., (formerly U.S. patent application Ser. No. 11/731,014), and to U.S. Provisional Patent Application Ser. No. 60/899,865, filed Feb. 6, 2007, entitled "Architectures for Electrochemical Systems," by Rackey, et al. Each of these applications is incorporated herein by reference.

FIELD OF INVENTION

The present invention generally relates to electrochemical systems and, in particular, to electrochemical systems for producing hydrogen and/or power.

BACKGROUND

Conventional methods for the separation of hydrogen from carbonaceous fuels typically require the steps shown in FIG. 1. These include 1) reaction to a syngas stream, 2) a cleanup step, 3) a shift reaction, and 4) a hydrogen separation step.

The syngas is obtained by reacting a fuel with steam, air, or pure oxygen to create a mixture of hydrogen, carbon monoxide, carbon dioxide, water, and lower hydrocarbons. Particulates and contaminants are removed in subsequent steps. The clean syngas stream is then reacted in a cascade of reactors to form as much hydrogen as possible through the water-gas shift reaction by passing it over a catalyst. More advanced shift reactors attempt to attain equilibrium at reduced temperature, while also performing the entire shift reaction in one single reactor. A subsequent separation step is required to remove the $CO_2$, which, in the conventional process, is typically done by pressure swing adsorption (PSA). The aforementioned PSA process can be energy intensive and is not continuous.

Other example methods of hydrogen separation include diffusion methods that use the difference in diffusion coefficients between gas molecules passing through a material. The material has either a microporosity that allows smaller molecules to diffuse at a higher rate than larger molecules, or the material preferentially dissolves certain atoms or molecules. Fouling of the material, as well as cost and energy intensity, are among the reasons that more advanced separation methods are needed.

SUMMARY OF THE INVENTION

The present invention generally relates to electrochemical systems for producing hydrogen and/or power. The subject matter of the present invention involves, in some cases, interrelated products, alternative solutions to a particular problem, and/or a plurality of different uses of one or more systems and/or articles.

The invention is directed to a system, according to a first aspect. In one set of embodiments, the system includes a source of fuel, a source of water, an oxidation chamber in fluidic communication with the source of fuel, a reaction chamber in fluidic communication with the oxidation chamber, a water conversion chamber, a second conduit in fluidic communication with the water conversion chamber for removing reaction products from the water conversion chamber, a cleanup chamber in fluidic communication with the reaction chamber, and a third conduit in fluidic communication with the cleanup chamber for removing reaction products from the cleanup chamber. In some cases, the water conversion chamber is contained within but fluidically separate from the reaction chamber, and in one embodiment, the water conversion chamber is in fluidic communication with the source of water via a first conduit. In certain instances, the first conduit and the second conduit exchange heat via countercurrent flow, and the first conduit and the third conduit exchange heat via countercurrent flow.

In another set of embodiments, the system includes a source of fuel, a source of water, an oxidation chamber in fluidic communication with the source of fuel, a reaction chamber in fluidic communication with the oxidation chamber, a water conversion chamber, and a cleanup chamber in fluidic communication with the reaction chamber and in thermal communication with the oxidation chamber. In some cases, the water conversion chamber is contained within but fluidically separate from the reaction chamber, and in one embodiment, the water conversion chamber is in fluidic communication with the source of water.

The system, in yet another set of embodiments, includes a source of fuel, a source of water, a housing, an oxidation chamber in fluidic communication with the source of fuel, a reaction chamber in fluidic communication with the oxidation chamber, a cleanup chamber in fluidic communication with the reaction chamber, and a water conversion chamber. In some cases, the water conversion chamber is contained within but fluidically separate from the reaction chamber, and in one embodiment, the water conversion chamber is in fluidic communication with the source of water. In some cases, each of the oxidation chamber, the reaction chamber, and the cleanup chamber may be contained within the housing In still another set of embodiments, the system includes a source of water, a source of fuel, a housing, a reaction chamber, contained within the housing, in fluidic communication with the source of fuel, a water conversion chamber, a second conduit in fluidic communication with the water conversion chamber for removing reaction products from the water conversion chamber, and a heat exchanger positioned externally of the housing. In some cases, the water conversion chamber is contained within but fluidically separate from the reaction chamber, and in one embodiment, the water conversion chamber is in fluidic communication with the source of water via a first conduit. In certain instances, the heat exchanger is constructed and arranged to exchange heat between the first conduit and the second conduit.

In yet another set of embodiments, the system includes a source of fuel, a source of water, a housing, an oxidation chamber in fluidic communication with the source of fuel, a reaction chamber in fluidic communication with the oxidation chamber, a cleanup chamber in fluidic communication with the reaction chamber, a water conversion chamber, and a CO-reacting species in fluidic communication with the cleanup chamber. In some cases, the water conversion chamber is contained within but fluidically separate from the reaction chamber, and in one embodiment, the water conversion chamber is in fluidic communication with the source of water. In certain instances, the catalyst, and at least one of the oxidation chamber, the reaction chamber, and the cleanup chamber are contained within the housing.

The system, according to still another set of embodiments, includes a source of fuel, a source of water, an oxidation chamber in fluidic communication with the source of fuel, a reaction chamber in fluidic communication with the oxidation chamber, a water conversion chamber, a cleanup chamber in fluidic communication with the reaction chamber, and a CO-reacting species in fluidic communication with the cleanup chamber. In some cases, the water conversion chamber is contained within but fluidically separate from the reaction chamber, and in one embodiment, the water conversion chamber is in fluidic communication with the source of water.

According to yet another set of embodiments, the system includes a source of fuel, a source of water, an oxidation chamber in fluidic communication with the source of fuel, a reaction chamber in fluidic communication with the oxidation chamber, a water conversion chamber, a cleanup chamber in fluidic communication with the reaction chamber, and an airflow device able to direct air to either or both the oxidation chamber and the cleanup chamber. In some cases, the water conversion chamber is contained within but fluidically separate from the reaction chamber, and in one embodiment, the water conversion chamber is in fluidic communication with the source of water.

In one set of embodiments, the system includes a source of fuel, a source of water, an oxidation chamber in fluidic communication with the source of fuel, a reaction chamber in fluidic communication with the oxidation chamber, a water conversion chamber, a cleanup chamber in fluidic communication with the reaction chamber, a first controller for controlling an amount of fuel entering the oxidation chamber, and a second controller for controlling an amount of air entering the oxidation chamber and/or the cleanup chamber. In some cases, the water conversion chamber is contained within but fluidically separate from the reaction chamber, and in one embodiment, the water conversion chamber is in fluidic communication with the source of water.

According to another set of embodiments, the system includes a source of fuel, a source of water, an oxidation chamber in fluidic communication with the source of fuel, a reaction chamber in fluidic communication with the oxidation chamber, a water conversion chamber, a cleanup chamber in fluidic communication with the reaction chamber and in thermal communication with the oxidation chamber, and a condenser in fluidic communication with the water conversion chamber, the condenser fluidically connected to the source of water and/or able to recirculate water back into the water conversion chamber. In some cases, the water conversion chamber is contained within but fluidically separate from the reaction chamber, and in one embodiment, the water conversion chamber is in fluidic communication with the source of water.

The system, according to one set of embodiments, includes a source of fuel, a source of water, an oxidation chamber in fluidic communication with the source of fuel, a reaction chamber in fluidic communication with the oxidation chamber, a water conversion chamber, a cleanup chamber in fluidic communication with the reaction chamber, an airflow device able to direct air to both the oxidation chamber and the cleanup chamber, and a regulator able to alter a ratio of flows from the airflow device to both the oxidation chamber and the cleanup chamber. In some cases, the water conversion chamber is contained within but fluidically separate from the reaction chamber, and in one embodiment, the water conversion chamber is in fluidic communication with the source of water.

Another aspect of the invention is directed to a method. In one set of embodiments, the method includes acts of partially oxidizing a mixture of a fuel and air in a first chamber (whereby some of the fuel remains unoxidized, in certain instances), partially reacting the unoxidized fuel with water across a membrane to generate hydrogen (whereby some of the fuel remains unoxidized, in certain instances), and igniting the unoxidized fuel in a second chamber at least in part using heat produced in the first chamber. In some cases, the water is isolated from the fuel except for ionic and electronic conduction across the membrane.

The method, according to another set of embodiments, includes an act of providing a source of fuel, and a system comprising an oxidation chamber in fluidic communication with the source of fuel, a reaction chamber in fluidic communication with the oxidation chamber, and a cleanup chamber in fluidic communication with the reaction chamber. The method also includes acts of determining an amount of fuel entering the system from the source of fuel, and directing a flow of air into the oxidation chamber and/or the cleanup chamber such that there is a substantially stoichiometric amount of oxygen to react with the fuel.

In still another set of embodiments, the method includes an act of providing a source of fuel, and a system comprising an oxidation chamber in fluidic communication with the source of fuel, a reaction chamber in fluidic communication with the oxidation chamber, and a cleanup chamber in fluidic communication with the reaction chamber. The method also includes acts of directing air and fuel from the source of fuel to the oxidation chamber at rates such that the fuel and the amount of oxygen from the air are present in the oxidation chamber in a substantially stoichiometric ratio, and substantially reacting all of the fuel with the oxygen within the oxidation chamber until the oxidation chamber reaches a predetermined temperature. In some cases, the method also includes an act of directing fuel to the oxidation chamber and directing air to the oxidation chamber and the cleanup chamber at rates such that the fuel and the amount of oxygen from the air are present in the system in a substantially stoichiometric ratio.

The method, in yet another set of embodiments, includes an act of providing a source of fuel, and a system comprising an oxidation chamber in fluidic communication with the source of fuel, a reaction chamber in fluidic communication with the oxidation chamber, and a cleanup chamber in fluidic communication with the reaction chamber. The method also includes an act of reacting air and fuel from the source of fuel in the oxidation chamber such that the flow of air and fuel in the oxidation chamber is laminar.

In still another set of embodiments, the method includes an act of providing a source of fuel, and a system comprising an oxidation chamber in fluidic communication with the source of fuel, a reaction chamber in fluidic communication with the oxidation chamber via a conduit, and a cleanup chamber in fluidic communication with the reaction chamber. The method also includes an act of reacting air and fuel from the source of fuel in the oxidation chamber and in the conduit.

In one set of embodiments, the method includes acts of reacting a fuel and water across a mixed ionically and electrically conducting material to generate hydrogen, and reacting at least a portion of the hydrogen to produce electricity. In some cases, the water is isolated from the fuel except for ionic and electronic conduction across the material, and in certain embodiments, the Nernst potential created across the material is at least about 0.025 V.

In another aspect, the present invention is directed to a method of making one or more of the embodiments described herein. In another aspect, the present invention is directed to a method of using one or more of the embodiments described herein.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
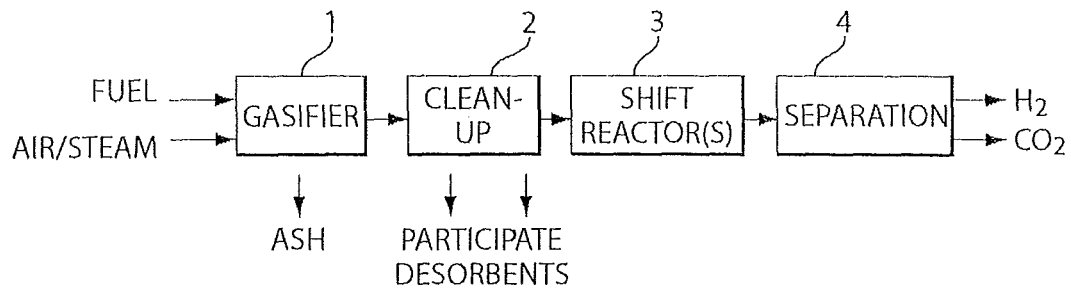
FIG. 1 is schematic representation of a process to produce hydrogen gas from a carbonaceous fuel source.

The present invention generally relates to electrochemical systems for producing hydrogen and/or power. Various aspects of the invention are directed to reactor designs for producing hydrogen and/or power from a fuel and water, conducting ceramics and other materials for such systems, including mixed ionically and electrically conducting ceramics which can be used for hydrogen gas generation, control systems for such systems, and methods of operating such systems.

Certain aspects of the invention relate generally to conducting ceramics and other materials for electrochemical systems and, in particular, to mixed ionically and electrically conducting ceramics which can be used, for example, for hydrogen gas generation from a gasified hydrocarbon stream. Some embodiments of the invention also relate to reactors and reactor systems that may include such materials, methods of using such reactors and systems, and the like.

One set of embodiments of the invention includes a conducting ceramic. In some cases, the ceramic comprises a first phase comprising an ionic conductor, and a second phase comprising an electrical conductor. An example of such a material is a material comprising $ZrO_2$ doped with $Sc_2O_3$ and yttrium-doped $SrTiO_3$. Certain embodiments of the invention, as discussed below, provide systems and methods of hydrogen gas and/or power generation from a fuel, such as a carbonaceous fuel, using materials such as those described above, for example, present within a membrane in a reactor. In some embodiments, a substantially pure hydrogen stream may be generated through in situ electrolysis. In certain cases, a material such as those described above may be used to facilitate ion and/or electron exchange between a first reaction involving a fuel such as a carbonaceous fuel, and a second reaction involving a water-hydrogen conversion reaction (i.e., where water is reduced to produce hydrogen gas). In other embodiments, the invention provides systems and methods for producing power from a fuel source, such as a carbonaceous fuel source.

Various embodiments of the invention use fuels such as carbonaceous fuels for consumption and/or driving various chemical reactions such as the production of hydrogen. Examples of carbonaceous fuels include, but are not limited to, conductive carbon, graphite, quasi-graphite, coal, coke, charcoal, fullerene, buckminsterfullerene, carbon black, activated carbon, decolorizing carbon, hydrocarbon fuels, an oxygen-containing hydrocarbon, carbon monoxide, fats, oils, a wood product, a biomass, and combinations thereof. Hydrocarbon fuels can be arbitrarily represented using the formula $C_xH_y$, although in reality, hydrocarbon fuels may also contain additional impurities besides carbon and hydrogen, for example, sulfur (S), oxygen (O), nitrogen (N), or the like. It should therefore be understood that, as used herein, references to "hydrocarbon fuels" or "$C_xH_y$," or similar terms, may also include other impurities besides the hydrocarbons themselves, such as sulfur, oxygen, nitrogen, etc., e.g., within the hydrocarbon molecular structures. Thus, non-limiting examples of hydrocarbon fuels will include saturated and unsaturated hydrocarbons, aliphatics, alicyclics, aromatics, and mixtures thereof. Other non-limiting examples of hydrocarbon fuels include gasoline, diesel, kerosene, methane, propane, butane, natural gas, and mixtures thereof. Examples of oxygen-containing hydrocarbon fuels include alcohols which further include $C_1$-$C_{20}$ alcohols and combinations thereof. Specific examples include methanol, ethanol, propanol, butanol and mixtures thereof.

Some embodiments of the invention use, as a fuel, coal, such as bituminous coal. Natural coal contains significant amounts of bound hydrogen and water. For instance, in bituminous Kentucky coal, the atomic composition is approximately $CH_{0.81}O_{0.08}$, which upon gasification yields a gas mixture with a partial oxygen pressure of about $10^{-20}$ bar at 800° C. Additional examples of suitable fuels include, but are not limited to, fluidized or gasified fuels such as gasified coal, gasified hydrocarbons, gasified petroleum coke, gasified oils, gasified waxes, gasified plastics, gasified waste streams, gasified biologically derived fuels such as wood, agricultural waste, sewage sludge, or landfill gas, sewage treatment plant digester gas, natural gas, methane, propane, butane, diesel, gasoline, crude oil, bunker (a by-product from the petrochemical industry), etc.

As mentioned above, some aspects of the invention include a material that is able to conduct both ions and electrons, i.e., the material exhibits "mixed conduction," since the material is both ionically and electronically conducting. This material may be referred to herein as a "mixed ionically and electrically conducting material," a "mixed conduction material," or a "MIEC" material. For example, the material may include a unitary material that is both ionically and electronically conducting, or the material may comprise two or more discrete phases (i.e., discrete regions within the material that have substantially the same composition). Non-limiting examples of such materials are disclosed in International Patent Application No. PCT/US2005/035714, filed Oct. 5, 2005, entitled "Conducting Ceramics for Electrochemical Systems," by S. Rackey, et al., published as WO 2006/041854 on Apr. 20, 2006; and U.S. Provisional Patent Application Ser. No. 60/787,555, filed Mar. 30, 2006, entitled "Conducting Ceramics for Electrochemical Systems," by S. Rackey, et al., each incorporated herein by reference. Other examples are disclosed in U.S. patent application Ser. No. 11/729,955, filed Mar. 29, 2007, entitled "Conducting Ceramics for Electrochemical Systems," by J. A. Shindle, et al., and International Patent Application No. PCT/US2007/007541, filed Mar. 29, 2007, entitled "Conducting Ceramics for Electrochemical Systems," by J. A. Shindle, et al.

Figure 2A:
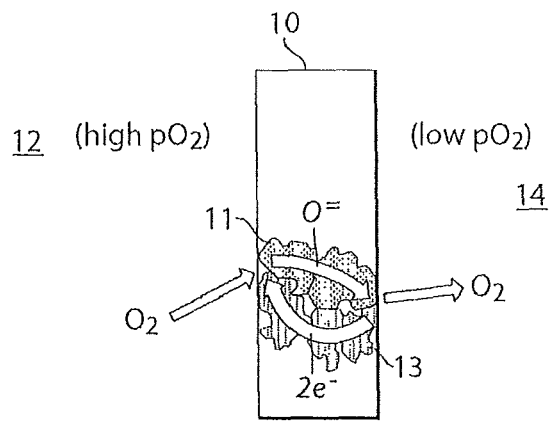
FIGS. 2A and 2B are schematic representations of various embodiments of the invention, in which a material of the invention is used in an electrochemical device.

One specific example of a reactor using such materials is shown in FIG. 2A. In this figure, a material of the invention 10 may be used in a reactor, separating a high oxygen partial pressure environment 12 from a low oxygen partial pressure environment 14. Material 10, in this example, includes ionically conducting phase 11, which is able to conduct oxygen ions, and an electrically conducting phase 13, which is able to transport electrons. In such a reactor, using suitable reactants, the net result may be oxygen transport across the material from region 12, having a high oxygen partial pressure to region 14, having a low oxygen partial pressure. For example, in compartment 12, a reduction process may occur (e.g., the conversion of water to hydrogen gas), while in compartment 14, an oxidation process may occur (for example, the conversion of a fuel to an oxidized fuel, which may be partial or complete oxidation, e.g., to water, carbon dioxide, $SO_2$, etc.). Due to the ionization of the oxygen, an electrical field may also be created across the material in some embodiments, which may form at least a portion of the driving force for transport across the material. It should be noted that, although oxygen is used in this example as the ion transported across material 10, in other embodiments, other species may be transportable across material 10 instead, or in addition to oxygen, for example, hydrogen.

In some cases, the material, or at least a portion of the material (for example, one or more discrete phases of the material), comprises a ceramic. For instance, in certain embodiments, the material comprises at least two phases, including a first phase comprising a ionic conductor, and a second phase comprising a electrical conductor, where the first phase and/or the second phase is a ceramic. Non-limiting examples of such materials include YST-YSZ compounds, YST-ScSZ compounds, YST-CGO compounds, or the like, as described in more detail below.

If two or more phases are present, in certain embodiments, they are arranged with respect to each other such that the first phase is substantially interconnected throughout the bulk of the material such that the material is ionically conductive, and/or the second phase is substantially interconnected throughout the material such that the material is electronically conductive. As used herein, "substantially interconnected" refers to a pathway that extends from a first surface of the material to a second surface that stays within only one phase of the material. Thus, for instance, an ionically conductive pathway would allow an ion, such as oxygen, to be transported from a first surface of the material to a second surface of the material while remaining in only one phase of the material, while an electronically conductive pathway would allow electrons to be transported within only one phase of the material from a first surface of the material to a second surface of the material.

If two phases are present in the material, the phases may be present in any ratio, for example, the ionically conductive phase may be present in the material at a percentage of between about 5% and 98% by weight, between about 10% and about 95% by weight, between about 30% and about 92% by weight, between about 40% and about 90% by weight, etc., with the balance being the electrically conductive phase, or vice versa.

As used herein, an "ionically conducting material" is a material in which one or more types of ions are able to be transported through, for example, oxygen ions or hydrogen ions. In some embodiments, the ionic conductor is, or comprises, a ceramic ionic conductor. The ceramic ionic conductor may comprise, in some cases, one or more of a La-ferrite material, a ceria, and a zirconia, each of which may be doped or undoped, as described in more detail below. A non-limiting example of a ceramic ionic conductor is La-ferrite material, e.g., a material comprising La, Sr, Cr, Fe, and O (for example, an "LSCrF" material such as $La_{0.2}Sr_{0.8}Cr_{0.2}Fe_{0.8}O_3$). In some cases, the ceramic ionic conductor has a perovskite structure, or a cubic structure. At relatively low oxygen partial pressures (for example, at a $pO_2$ below about $10^{-15}$ bar), the ceramic ionic conductor may have an ionic conductivity of about 0.2 S/cm to about 0.8 S/cm at a temperature of between about 800° C. and about 1000° C. In other cases, the ionic conductivity may be at least about 0.2 S/cm, at least about 0.3 S/cm, at least about 0.4 S/cm, at least about 0.5 S/cm, at least about 0.6 S/cm, at least about 0.7 S/cm, at least about 0.8 S/cm, at least about 0.9 S/cm, or at least about 1.0 S/cm or more at such temperatures.

In certain embodiments, the ionic conductor comprises a cerate (i.e., a cerium oxide), for example, ceria or $CeO_2$. Examples of ceria-containing materials include, but are not limited to, a $CeO_2$-based perovskite, such as $Ce_{0.9}Gd_{0.1}O_2$ or $Ce_{1-x}Gd_xO_2$, where x is no more than about 0.5, or lanthanum-doped ceria, such as $(CeO)_{1-n}(LaO_5)_n$ where n is from about 0.01 to about 0.2. In some cases, the ceria may be doped with gadolinium. For example, during production, a gadolinium oxide and a cerium oxide may be mixed together to produce a "CGO" (gadolinium-doped cerium oxide). The CGO material may have a perovskite structure. The CGO material may include about 10% to about 20% gadolinium, or about 12% to about 18% gadolinium. In certain cases the CGO material may have a conductivity of between about 0.06 S/cm and about 0.24 S/cm at a temperature of between about 700° C. and about 900° C., at relatively low oxygen partial pressures (e.g., below about $10^{-15}$ bar), and/or in an oxidizing atmosphere. Below a partial pressure of about $10^{-15}$ bar, the CGO material may exhibit higher ionic conductivities. For instance, at a partial pressure of $10^{-18}$ bar and a temperature of 900° C., the CGO material may have an ionic conductivity of over about 0.4 S/cm and an electronic conductivity of about 1.6 S/cm. CGO may also have the added benefit of acting as a catalyst for reduction, in some cases. Such a reduction may effectively increase the interfacial area of the material.

In yet other embodiments of the invention, the ionic conductor comprises a zirconia (i.e., a zirconium oxide material). Examples of zirconia materials include, but are not limited to, $(ZrO_2)(ZrO_2)(HfO_2)_{0.02}(Y_2O_3)_{0.08}$, $(ZrO_2)(Y_2O_3)_{0.08}$, $(ZrO_2)(HfO_2)_{0.02}(Y_2O_3)_{0.08}$, $(ZrO_2)(HfO_2)_{0.02}(Y_2O_3)_{0.05}$, $(ZrO_2)(HfO_2)_{0.02}(Y_2O_3)_{0.08}(TiO_2)_{0.10}$, $(ZrO_2)(HfO_2)_{0.02}(Y_2O_3)_{0.08}(Al_2O_3)_{0.10}$, $(ZrO_2)(Y_2O_3)_{0.08}(Fe_2O_3)_{0.05}$, $(ZrO_2)(Y_2O_3)_{0.08}(CoO)_{0.05}$, $(ZrO_2)(Y_2O_3)_{0.08}(ZnO)_{0.05}$, $(ZrO_2)(Y_2O_3)_{0.08}(NiO)_{0.05}$, $(ZrO_2)(Y_2O_3)_{0.08}(CuO)_{0.05}$, $(ZrO_2)(Y_2O_3)_{0.08}(MnO)_{0.05}$, and $ZrO_2CaO$. In some embodiments, the zirconia may be stabilized in a cubic structure using one or more dopants, for example, metals such as nickel, or transition metals such as Y or Sc, which can be added in a quantity sufficient to give the doped zirconia a cubic structure. For instance, during production of the zirconia, yttria ($Y_2O_3$) and/or scandia ($Sc_2O_3$) may be added as a dopant material to produce a yttria-stabilized zirconia material ("YSZ"), a scandia-stabilized zirconia material ("ScSZ"), or a zirconia stabilized with both yttria and scandia. As used herein, a material that "stabilizes" zirconia is a material that has been added (doped) to the zirconia in a quantity sufficient to cause the zirconia to form a cubic structure. The yttria and/or scandia may be added in any suitable concentration, for example, at mole ratios of about 2 mol %, about 4 mol %, about 6 mol %, about 8 mol %, about 10 mol %, etc. As non-limiting examples, an "8YSZ" material (i.e., a YSZ material doped with 8 mol % yttria) can be prepared, which may have an ionic conductivity of between about 0.02 S/cm to about 0.1 S/cm at a temperature of between about 800° C. and about 1000° C.; or a "10ScSZ" material (i.e., a ScSZ doped with 10 mol % scandia) can be prepared, which may have an ionic conductivity of between about 0.1 S/cm and about 0.3 S/cm at a temperature of between about 800° C. and about 1000° C. YSZ that is not compounded with an ionically-conductive material may also be useful in certain embodiments.

In still other embodiments, the ionic conductor may comprise a material having a formula $(ZrO_2)(HfO_2)_a(TiO_2)_b(Al_2O_3)_c(Y_2O_3)_d(M_xO_y)_e$ where a is from 0 to about 0.2, b is from 0 to about 0.5 c is from 0 to about 0.5, d is from 0 to about 0.5, x is greater than 0 and less than or equal to 2, y is greater than 0 and less than or equal to 3, e is from 0 to about 0.5, and M is selected from the group consisting of calcium, magnesium, manganese, iron, cobalt, nickel, copper, and zinc. Non-limiting examples include a $LaGaO_3$-based perovskite oxide, such as $La_{1-x}A_xGa_{1-y}B_yO_3$ where A can be Sr or Ca, B can be Mg, Fe, Co and x is from about 0.1 to about 0.5 and y is from about 0.1 to about 0.5 (e.g. $La_{0.9}Sr_{0.1}Ga_{0.8}Mg_{0.2}O_3$); a $PrGaO_3$-based perovskite oxide electrolyte, such as $Pr_{0.93}Sr_{0.07}Ga_{0.85}Mg_{0.15}O_3$ or $Pr_{0.93}Ca_{0.07}Ga_{0.85}Mg_{0.15}O_3$; and a $Ba_2In_2O_5$-based perovskite oxide electrolyte, such as $Ba_2(In_{1-x}Ga_x)_2O_5$ or $(Ba_{1-x}La_x)In_2O_5$, where is x is from about 0.2 to about 0.5.

As used herein, an "electronic conducting material" is a material through which electrons can be readily transported. The electronic conductor may be, for example, a conducting material or a semiconducting material. The electronic conductor, in some embodiments, may be, or comprise, a ceramic electronic conductor. For instance, the ceramic electronic conductor may comprise one or more of a LST material, a YST material, a YLST material, and an LCC material. As used herein, "LCC" refers to any lanthanum-calcium-chromium oxide, i.e., the LCC material comprises La, Ca, Cr, and O, for example, $La_{0.8}Ca_{0.2}CrO_3$. $La_{0.8}Ca_{0.2}CrO_3$ can have, in some embodiments, an electronic conductivity of ranging between about 40 S/cm (e.g., in reducing atmospheres) to about 80 S/cm (e.g., in oxidizing atmospheres). In some cases, pressureless sintering to full density of the LCC at 1400° C. may be used.

In one embodiment, the ceramic electronic conductor comprises a doped strontium titanate material or a YST (Y—Sr—Ti) material, i.e., a ceramic material comprising Y, Sr, Ti, and O, for example, $Sr_{0.88}Y_{0.08}TiO_3$. In some cases, the material may have a formula $Sr_{1-y}Y_xTiO_3$, where x may be between about 0.06 and about 0.1, between about 0.01 and about 0.5, between about 0.1 and about 0.5, between about 0.02 and about 0.4, or between about 0.2 and about 0.4 in some cases. In certain embodiments, y may be between x and 2x (for example, 1.5x). z may be between 0 and 1. YST materials may also have reduced electrode polarization in some cases. In some embodiments, the YST material may be prepared by doping $SrTiO_3$ with yttrium. Such a YST material may have a relatively high electronic conductivity at an elevated temperature, for example, an electronic conductivity of about 50 S/cm to about 80 S/cm at a temperature of 800° C. and an oxygen partial of between about $10^{-14}$ and about $10^{-19}$ bar.

In another embodiment, the ceramic electronic conductor may comprise a material comprising a LST (La—Sr—Ti) material, i.e., a ceramic material comprising La, Sr, Ti, and O, Such materials can be produced, for instance, by doping $SrTiO_3$ with a lanthanum oxide. The LST material may have a formula $Sr_{1-y}La_xTiO_3$ in some embodiments, where x may be between about 0.01 and about 0.6, between about 0.02 and about 0.5, between about 0.04 and about 0.4, between about 0.1 and about 0.5, or between about 0.2 and about 0.4 in some cases. In some embodiments, y may be between x and 2x, for example, about 1.5x. For example, the lanthanum oxide may be added at a dopant at concentrations of between about 20 mol % La and about 40 mol %.

In yet another embodiment, the ceramic electronic conductor may be both an LST and a YST material (a "YLST" material), i.e., the ceramic material comprises Y, La, Sr, Ti, and O. The YLST material may have, in some cases, a formula $Sr_{1-y}(Y_zLa_{1-z})_xTiO_3$, where x may be between about 0.01 and about 0.5, between 0.1 and about 0.99, between about 0.1 and about 0.5, between about 0.02 and about 0.4, between about 0.2 and about 0.4, or between about 0.2 and about 0.9 in some cases; y may be between x and 2x, for instance, about 1.5x; and z may be any number between 0 and 1, for example, 0.25, 0.5, 0.75, etc. In still other embodiments, the material may comprise a strontium titanate doped with one or more of Y, La, Nb, Yb, Gd, Sm, Ce, Sc, and Pr. For example, in one embodiment, the material has a formula $A_{1-y}Sr_xTiO_3$, or $A_{1-y}Sr_xTiO_3$, where A represents one or more atoms, each independently selected from the group consisting of Y, La, Nb, Yb, Gd, Sm, Ce, Sc, or Pr, and x may be between about 0.01 and about 0.5, between about 0.1 and about 0.99, between about 0.1 and about 0.5, between about 0.02 and about 0.4, between about 0.2 and about 0.4, or between about 0.2 and about 0.9 in some cases. For instance, $A_{1-x}$ or $A_{1-1.5x}$ in these structures may represent $A^1a_1$ (i.e., $A^1{}_{1-x}La_xTiO_3$), $A^1a_1A^2a_2$ (i.e., $A^1a_1A^2a_2$ $La_xTiO_3$), $A^1a_1A^2a_2A^3a_3$ (i.e., $A^1a_1A^2a_2A^3a_3$ $La_xTiO_3$), . . . , etc., where each of $A^1, A^2, A^3, \ldots$, etc. is independently selected from the group consisting of Y, Sc, Ce, La, Nb, Yb, Gd, Sm, Ce, Sc, or Pr, and each of $a_1$, $a_2$, $a_3$, ..., etc. sums to 1-y or 1-x. In some cases, the coefficients are chosen to achieve charge neutrality.

As a specific, non-limiting example, the ceramic electronic conductor may be a ScCeST material in some embodiments, i.e., the ceramic material comprises Sc, Ce, Sr, Ti, and O. For example, the material may have, in some cases, a formula $Sc_xCe_ySr_zTiO_3$, where x, y, and z are chosen to achieve charge neutrality. For instance, x, y, and/or z may be between about 0.01 and about 0.5, between about 0.1 and about 0.5, between about 0.02 and about 0.4 or between about 0.2 and about 0.4 in some cases.

In some embodiments, the mixed ionically and electrically conducting material is substantially non-porous, i.e., the porosity of the material is less than about 1 open pore/mm$^2$, and this can improve ionic and/or electrical conductivity. For example, the material may have a porosity of less than about 1 open pore/mm$^2$, less than about 1 open pore/cm$^2$ or the like. "Open pores" can be measured in a material by creating a pressure differential from one side of the material to the other side that is at least about 5 psi (34.5 kPa), coating the lower-pressure surface with a thin film of a liquid such as alcohol, and determining the number of bubbles that are created due to the pressure differential, where the presence of a stream of bubbles indicates the presence of an open pore. Another example method of determining porosity is a helium leak test, where a leak rate in the order of at most 0.01 cm$^3$/min of helium per cm$^2$ of cell area and per psi of pressure would be required (1 psi is about 6.9 kilopascals (kPa)).

Combinations of density, non-porosity, ratio of ionically to electrically conductive phase, and/or other adjustments can be made based on this disclosure to tailor combined conductivity of material, i.e., combined (ionic and electrical) resistivity. For example, the material may have a resistivity of less than about 1000 Ohm cm (Ωcm), less than about 750 Ohm cm, less than about 500 Ohm cm, less than about 250 Ohm cm, less than about 200 Ohm cm, less than about 150 Ohm cm, less than about 100 Ohm cm, etc.

The material may also be substantially gas impermeable in certain cases, i.e., the material can be used to maintain separation of a first gas in a first compartment of a chamber on one side of the material and a second gas in a second compartment on another side of the material (for example, with compartments being on each side of the material, as illustrated schematically in FIG. 2A), both gases being at ambient pressure (about 1 bar). For example, the ionically and electrically conducting material may be sufficiently gas impermeable that, if two gases are placed on either side of a mixed ionically and electrically conducting material, less than about 5% of the gases, less than about 3%, or less than about 1% of the gases on either side of the material are able to mix after a period of at least a day. In some cases, no mixing of the gases can be detected after a day.

In one set of embodiments, the material is positioned in contact with a substrate, such as a porous substrate. The porous substrate may have a porosity that is at least sufficient to allow access to the material by gases such as oxygen, hydrogen, and/or water vapor, while providing at least some mechanical stability of the material, for instance, if the mixed ionically and electrically conducting material is present as a thin layer, for example, having a thickness of less than about 50 micrometers, for instance, between about 10 and about 20 micrometers or between about 10 and about 40 micrometers. The material, at these or other thicknesses, also may have a particularly high overall aspect ratio, i.e., its thickness may be quite small relative to another dimension perpendicular to the thickness, or to two other dimensions each perpendicular to the thickness.

The material and/or the substrate may have any shape. For example, in one embodiment, the material is deposited on the outside of a substrate that is a porous tube. In another embodiment, the material is deposited on the surface of a planar porous substrate. The porous substrate may be any suitable porous material, for example, a ceramic, a polymer, or a metal.

In one set of embodiments, one or more electrodes may be disposed on or proximate the material. The electrode may serve to catalyze the reactions occurring on the membranes, and/or distribute ions and/or electrons in the material. For example, the electrode may catalyze a reaction of $O_2$ to produce $O^{2-}$, which may be distributed into an ionically conductive portion of the material, and/or the electrode may catalyze a reaction of $O^{2-}$ to $O_2$ and electrons, which may be distributed into an electronically conductive portion of the material. In some cases, the material may have one electrode positioned on either side of the material, e.g., a first electrode on the reaction chamber side and a second electrode on the water conversion side. In some cases, the electrode may be formed out of compositions similar to the material itself (e.g., as discussed above), for example, the electrode may comprise a ceramic, or the electrode may comprise at least two phases, including a first phase comprising a ionic conductor, and a second phase comprising a electrical conductor. Non-limiting examples of such materials include YST-YSZ compounds, YST-ScSZ compounds, YST-CGO compounds, or the like, as described herein. If more than one electrode is present, the electrodes may have the same and/or different compositions. In some cases, the electrode may be relatively thin, e.g., of similar dimensions as the material. For instance, the electrode may be between about 10 micrometers and about 40 micrometers thick, or between about 15 micrometers and about 25 micrometers thick. In one embodiment, the electrode is about 20 micrometers thick.

In some embodiments, the electrode is porous. For example, the electrode may have a porosity of between about 30% and about 50%, or about 35% and about 45%. In one embodiment, the porosity of the electrode is about 40%. If more than one electrode is present, the electrodes may have the same and/or different porosities. A non-limiting example of a process to produce a porous electrode is as follows: the electrode may be made similar to preparing materials as described herein, except that a pore-forming species may be included. The pore-forming species is one that is oxidized or otherwise removed when the electrode is prepared. For example, upon firing of a precursor powder to produce the electrode, the pore-forming species may be removed, causing pores to be formed within the electrode. Non-limiting examples of pore-forming species include carbon or graphite, but virtually any substance that will be removed can be used.

Figure 2B:
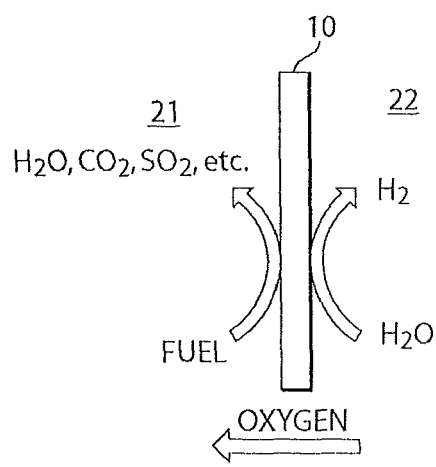

In some embodiments of the invention, hydrogen (for example, substantially pure hydrogen gas) is produced using a reactor containing a mixed ionically and electrically conducting material, such as those described herein. For example, with reference to FIG. 2B, a mixed ionically and electrically conducting material 10 may be used to separate first compartment 21 and second compartment 22. In compartment 21, a fuel is oxidized, for example, to produce an oxidized fuel, which may be partial or complete oxidation, e.g., to water, carbon dioxide ($CO_2$), $SO_2$, etc., while in compartment 22, a reduction reaction occurs, for example, water is reduced to produce hydrogen gas, i.e., in situ electrolysis.

Oxygen that is produced from the reduction of water to hydrogen gas (or other reduction reaction) can be transported across material 10 from compartment 22 to compartment 21, where it can react with the fuel, while electrons that are generated from the oxidation of the fuel return across material 10 to participate in the reduction of water to hydrogen gas. The hydrogen gas produced in this reaction may be separated and isolated, and/or routed to devices that can consume hydrogen, for example, fuel cells as discussed in detail below. Thus, in certain embodiments, a reactor of the invention may oxidize a fuel and simultaneously produce hydrogen gas within the same reactor. In some cases, the hydrogen can be consumed to produce power.

In some embodiments, the hydrogen may be diluted with water. Removal of the water may be accomplished, for example, through condensation or a membrane, and is usually much simpler than the removal of CO, $CO_2$, sulfur compounds, higher hydrocarbons, or the like. Thus, it should be understood that, in discussions herein with respect to hydrogen, there may be some water present. Also, in some cases, the presence of small amounts (<1000 ppm) of CO, $CO_2$, sulfur compounds, and/or higher hydrocarbons in the hydrogen stream may also be present, although they may be ignored in some instances. In some cases, such impurities may enter the stream due to imperfections in the membrane, seals, welds, etc., the impurities may form as products from corrosion reactions, or the impurities may be present in the feed water.

In some embodiments, the oxygen used to oxidize the fuel comes only from the mixed conducting material at steady state, although additional oxygen may be added for start-up and/or thermal balance requirements. In other embodiments, however, additional oxygen may be supplied even during steady state, for example, if more complete oxidation of the fuel is desired, if higher reaction temperatures are needed, etc.

The hydrogen gas produced by the reactor may exit the reactor in a first stream, while waste gases produced from the oxidation of the fuel may exit the reactor in a second stream, and/or be used in other operations within the reactor, e.g., as discussed below. The hydrogen gas that is produced by the reactor may thus be substantially pure and free of contaminants (gaseous, particulate, etc., e.g., which may be present within the fuel), as the hydrogen gas is produced in a physically separate compartment than the compartment where the fuel has been oxidized. Such a physically separate arrangement may be advantageous, for example, in embodiments where impurities or other components of the fuel could harm or foul the reduction of water to hydrogen gas. Thus, a substantially pure hydrogen stream can be produced in some embodiments. For example, the substantially pure hydrogen stream may be at least about 90%, at least about 95%, at least about 97%, at least about 98%, or at least about 99% pure on a volumetric basis. In other embodiments, however, some water may be present within the hydrogen stream exiting the reactor (i.e., a "wet hydrogen" stream). Of course, in such cases, such a wet hydrogen stream may optionally be subsequently separated into water and hydrogen gas, before and/or after leaving the reactor, for example, using a condenser, as is discussed below. In some cases, the waste gases may be recycled within the reactor, for example, to facilitate gasification of a fuel, for instance, a carbonaceous fuel such as coal. In some instances, partially oxidized fuels exiting the reactor may be recycled to effect further oxidation, and/or the partially oxidized fuels may be further reacted within the reactor, e.g., in a cleanup chamber.

The reactor, as described above, does not necessarily require a water-gas shift reaction that produces hydrogen gas directly from syngas, and therefore raw gasified carbonaceous fuel streams can be oxidized to produce hydrogen gas, in contrast to prior art systems where a fuel or syngas stream needs to be additionally processed to be free of contaminants such as $H_2S$, which can poison catalysts in those prior art systems. In certain embodiments, the reactor can be placed within a gasifier compartment itself (i.e., the compartment in which a carbonaceous fuel is reacted to produce a gasified hydrocarbon, such as syngas), for instance, as discussed in detail below.

The hydrogen gas produced using techniques such as those described above may be separated from the reactor, e.g., for use in reactions or power generation, or in some embodiments of the invention, the hydrogen gas may be oxidized to produce electrical power, for example, in a fuel cell. In some cases, the process of power generation may occur simultaneously with hydrogen gas production. Any suitable system that can react hydrogen gas to produce water and power may be used, for example, fuel cells. Non-limiting examples of fuel cells include solid oxide fuel cells, molten carbonate fuel cells, phosphoric acid fuel cells, polymer electrolyte fuel cells (e.g., using proton exchange membranes), alkaline fuel cells, or the like, many of which are commercially available. Thus, in some cases, hydrogen is provided in a reactor (e.g., supplied externally as a fuel, and/or produced by the reactor), which is reacted in a first portion of a reactor to produce water, and then re-converted to hydrogen in a second portion of the reactor. The hydrogen may be recycled back to the first portion of the reactor, e.g., as is shown in FIGS. 3A-3D, and/or the hydrogen may be separated as described above, or even used as a fuel for an electrochemical device not involving either the first or second portions, as a reactant for a chemical process, or the like. The first portion and second portion may be contained within the same chamber or vessel, or the first and second portions may be in separate vessels that are in fluidic communication, e.g., using pipes, tubing, conduits, or the like, for example, a first vessel may contain a mixed conduction material (e.g., as described herein) and a second vessel may contain a fuel cell, a vessel may contain therein both a mixed conduction material and a fuel cell (e.g., such that hydrogen and/or water within the vessel is in fluid communication with both the mixed conduction material and the fuel cell), or the like.

As discussed, other aspects of the invention generally relate to reactors and reactor systems that may include materials such as those described above. Non-limiting examples of various reactor systems are shown schematically in FIGS. 3A-3C. In some of these figures, a mixed conduction material 30 is used together with a fuel cell. In these figures, both electrons ($e^-$) and oxygen ($O^=$ or $O^{2-}$) can be transported across mixed conduction material 30, which separates an oxidation compartment 31 from a reduction compartment 32. On one side of material 30, a fuel, such as a carbonaceous fuel, optionally comprising sulfur or other impurities (represented as $C_xH_y+S_z$) can be completely oxidized to produce $H_2O$, $CO_2$, $SO_2$, etc. In other embodiments, however, the fuel may be only partially oxidized, e.g., as discussed below. The oxidation reaction also produces electrons, which are transported across the mixed conduction material 30. The electrons are used in a reduction reaction, e.g., reacted with water ($H_2O$) to produce hydrogen gas ($H_2$) and oxygen ions. The ions can be transported across mixed conduction material 30.

The hydrogen gas may be used to regenerate water in the fuel cell, optionally producing electric current in the process, which may be harnessed. The fuel cell may be separate from the reactor where hydrogen is produced from water, for example, contained within a compartment or a vessel that is physically separate from, but is in fluidic communication with, the compartment in which hydrogen is produced from water; or in some cases, the fuel cell may be an integral part of the reactor, i.e., in a compartment of the reactor, a mixture of hydrogen and water (which may be present as steam) is simultaneously exposed to a reaction in which hydrogen is produced from water (e.g., using a mixed ionically and electrically conducting material, as previously described), and a reaction in which water is produced from hydrogen (e.g., in a fuel cell). The fuel cell may react $H_2$ to produce water ($H_2O$) by reaction with hydroxide ions ($OH^-$), oxygen ions ($O^{2-}$), carbonate ions ($CO_3^{2-}$), etc., which in the process, may release electrons that can be harnessed as power 35.

Figure 3A:
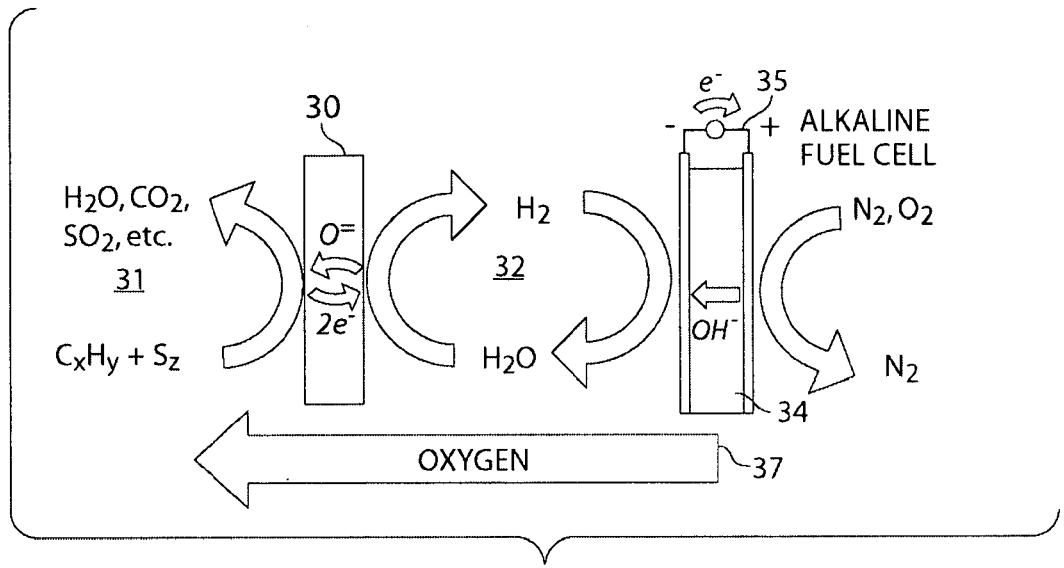
FIGS. 3A-3D are schematic diagrams of various fuel cells that can be used with various embodiments of the invention, and the chemical reactions that may occur during use.
Figure 3B:
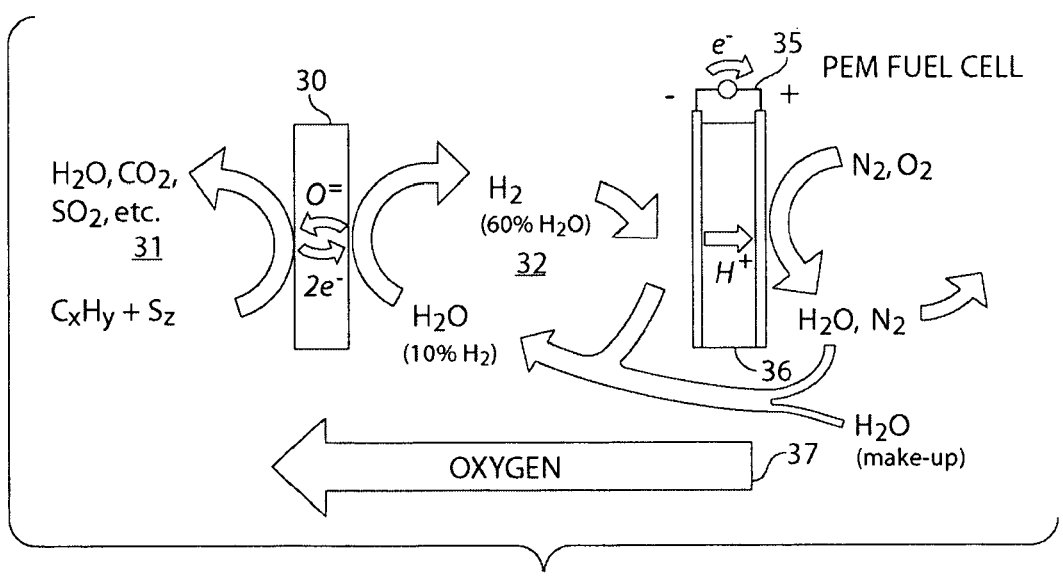
Figure 3C:
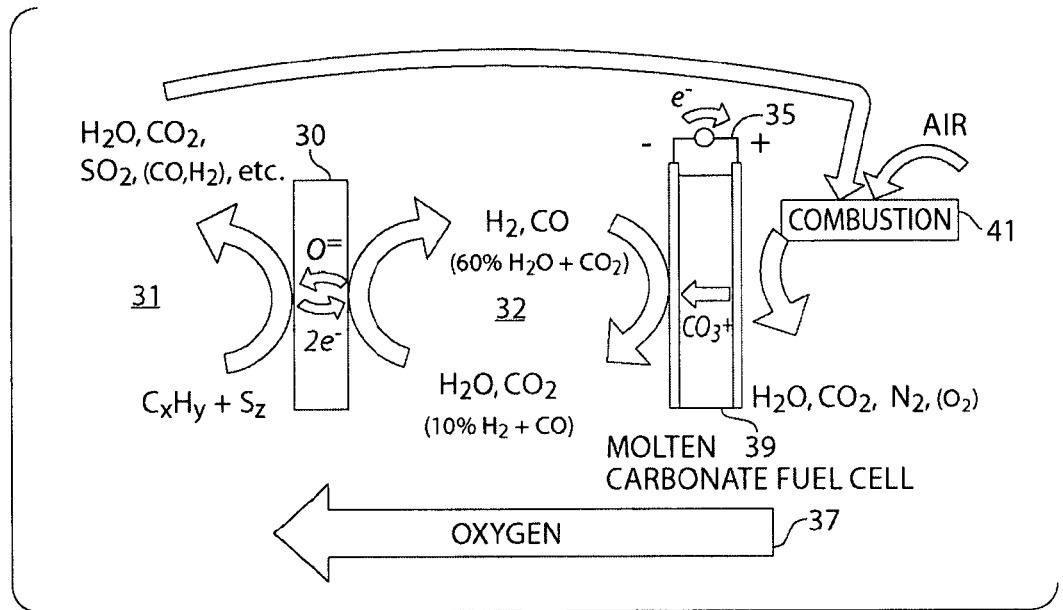

It should be noted that the net result of such a reaction system, as is shown in FIGS. 3A-3C, is that oxygen enters the fuel cell, and, through a series of reactions, reacts with and oxidizes the fuel. Thus, there is a net transport of oxygen through this reaction system, as is shown by arrow 37.

In FIG. 3A, as an example, an alkaline fuel cell is demonstrated, where $OH^-$ is transported through the fuel cell to reduce hydrogen gas to water ($H_2+2OH^- \rightarrow 2H_2O+2e^-$), in the process, generating electrons which are harnessed. The OH may come from a source such as pure oxygen source, or from air (as is shown in FIG. 3A) or another source comprising oxygen, for example, produced using water in the reaction ($O_2+2H_2O+4e^- \rightarrow 4OH^-$). In some cases, the alkaline fuel cell uses a matrix 34 saturated with an aqueous alkaline solution, such as potassium hydroxide (KOH), in which the OH is transported.

In FIG. 3B, a fuel cell using a proton exchange membrane is demonstrated. In this fuel cell, protons can be transported through the proton exchange membrane, although electrons cannot. Thus, while protons ($H^+$) passes through the membrane, the electrons must pass through an external circuit, where they can be harnessed for power 35. In this system, some of the hydrogen gas within compartment 32 is broken down to produce the $H^+$ which is transported through the proton exchange membrane. Consequently, make-up hydrogen may be added to compartment 32, e.g., as hydrogen gas and/or as water. Upon exiting the proton exchange membrane, the $H^+$ is reacted, for example, with oxygen (e.g., in air) to produce water. Proton exchange membranes, such as the electrolyte/membrane 36, are well-known in the art and can be made, for example, from certain polymers.

FIG. 3C shows a molten carbonate fuel cell, as yet another example. In a molten carbonate fuel cell, an electrolyte comprises a molten carbonate salt mixture, which may be suspended in a porous ceramic matrix 39, for example, a lithium aluminum oxide ($LiAlO_2$) matrix. A fuel is combusted 41, for example, in air, and the combustion products are exposed to the molten carbonate fuel cell. Optionally, the combustion processes are recycled from compartment 31, as is indicated by arrow 42. Carbonates are produced in the matrix, which are then transported to compartment 32. $H_2O$ and/or $CO_2$ within compartment 32 is reduced as is previously described, e.g., to $H_2$ and/or CO, respectively. The $H_2$ and/or CO may then react with the carbonates from matrix 39 to regenerate $H_2O$ and/or $CO_2$, respectively. It should be emphasized that, in some embodiments, no $H_2/H_2O$ is necessary, and only $CO/CO_2$ is used as the redox species within compartment 32.

Figure 3D:
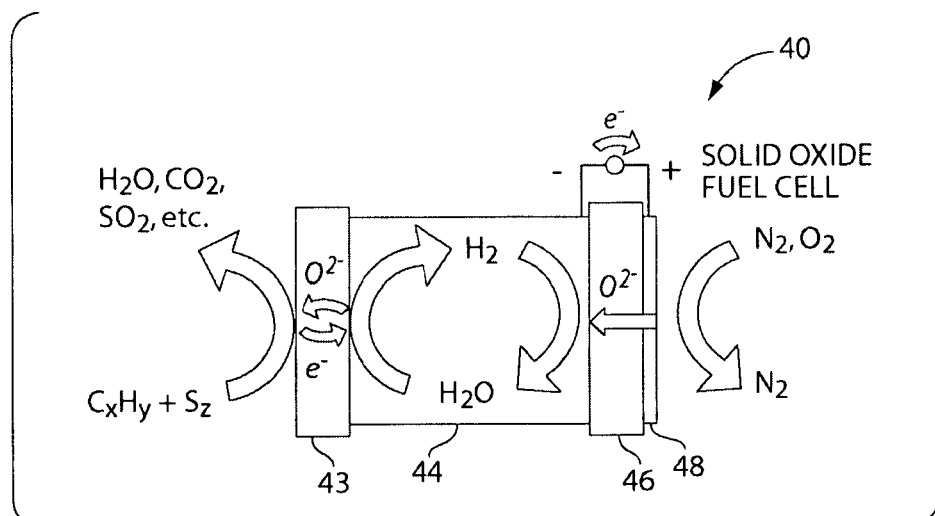

Another non-limiting example is shown in FIG. 3D. In this figure, reactor 40 includes a mixed conduction material 43, an anode 44, an electrolyte 46, and a cathode 48. Anode 44, electrolyte 46, and cathode 48 together form a fuel cell, for example, a solid oxide fuel cell. Within reactor 40, oxygen (e.g., from air) is transported through electrolyte 46 to anode 44. In some cases, anode 44 is a liquid anode. Within anode 44, the oxygen ions react with hydrogen to produce water. The hydrogen may originate from within reactor 40, and/or the hydrogen may be externally supplied. The water produced in this reaction is then reduced at mixed conduction material 43, producing oxygen which is transported through mixed conduction material 43 to oxidize a fuel, for example, a carbonaceous fuel (represented in FIG. 3D by $C_xH_y$ and $S_z$).

It should be noted that these figures are intended to be schematic representations of useful general reaction schemes, and have been simplified for clarity. The reactions shown in FIGS. 3A-3D may occur in one or more vessels or housings. For example, the mixed conduction material and the fuel cell may be contained within a single vessel or housing, or the mixed conduction material may be contained in a first vessel or housing, and the fuel cell may be contained in a second vessel or housing physically separated but in fluidic communication with the first vessel or housing, for example, using pipes, tubing, conduits, or the like.

More specific, non-limiting examples of such reactor systems follow. It should be noted that, although the reactor systems described herein are typically described as incorporating a mixed ionically and electrically conducting material, that is by way of example only, and in other embodiments, other materials may be used as well in the reactor systems described herein. A suitable material is one that is able to reduce water to hydrogen and oxidize a fuel, typically in separate chambers in a reactor, often in coupled redox reactions. For instance, a suitable material may be a unitary ceramic (e.g., one that conducts both electrons and oxygen ions), a polymer, or the like. In some embodiments, a reactor system includes a first chamber and a second chamber separated by a conducting ceramic or other material, e.g., as described above with reference to FIG. 2B. In some cases, the water conversion chamber is contained within the reaction chamber, and in certain instances, the water conversion chamber is contained within, but is fluidically separate from, the reaction chamber, as discussed in more detail below.

Figure 4:
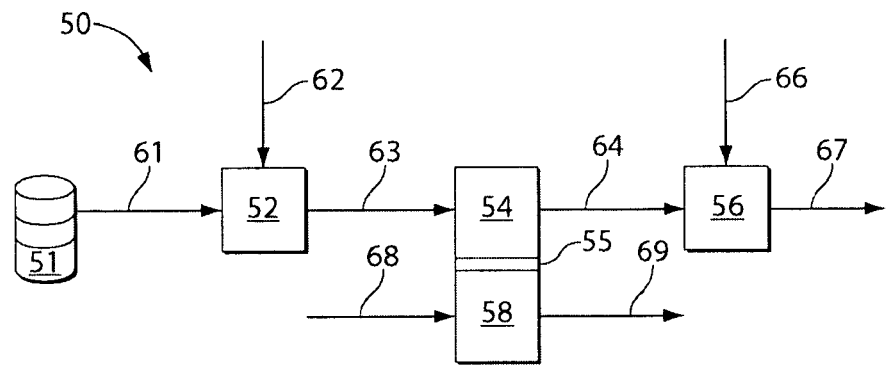
FIG. 4 is a schematic diagram of an embodiment of the invention.

FIG. 4 illustrates a system 50 that includes an oxidation chamber 52, a reaction chamber 54, and a cleanup chamber 56. The reaction within system 50 may proceed similar to the reaction described above with respect to FIGS. 2A and 2B. In FIG. 4, fuel from a fuel source 51 passes through conduit 61 into oxidation chamber 52. The fuel may be any suitable fuel, such as those previously described. Also entering oxidation chamber 52 is an oxidant, for instance, air containing oxygen, which enters through conduit 62. The oxidant can be any species able to serve as an oxidizing agent during the reaction, such as air, pure oxygen, or an oxygen-containing gas, and the oxidant may be at atmospheric pressure, or greater or less in some cases. Within oxidation chamber 52, the fuel and oxygen are mixed and partially react, oxidizing the fuel, and in some cases, causing at least partial gasification of the fuel. In some cases, the reaction is facilitated by an ignition device, for example, an electric spark, e.g., from an electrode (not shown). The mixture (including unoxidized fuel, oxygen, partially oxidized fuel, as well as CO, $CO_2$, $H_2O$, and other products of the fuel oxidation process) then pass into reaction chamber 54 through conduit 63.

In one set of embodiments, the oxidation chamber can process fuel into a form that can be readily used in the system. For example, the reaction chamber may be operated at temperatures greater than about 600° C., and many hydrocarbons, such as hydrocarbon fuels or coals, can be chemically unstable and subject to thermal cracking. During this thermal cracking, hydrogen will be at least partially released. Although the hydrogen and/or potential trace light hydrocarbons and/or CO may be able to react in the reaction chamber, the remaining solid state carbon may not necessarily be able to react in a similar fashion. In some cases, when certain liquid hydrocarbons crack, they may result in various solid state carbons such as soots, tars, or the like. These forms of solid state carbon and/or heavy hydrocarbon may tend to foul the reactor and/or clog various passages and/or conduits. Thus, in some cases, the system as described herein may partially oxidize the fuel such that any carbon produced is substantially thermodynamically unstable, e.g., the fuel within the oxidation chamber may be sufficiently oxidized such that elemental or solid state carbon within the first chamber (e.g., produced through oxidation of fuel) is substantially thermodynamically unstable, i.e., a substantial fraction of the soot in the oxidation chamber, or in any downstream compartments, is oxidized in some fashion, for example, reacting with $CO_2$ to produce CO, reacting with $H_2O$ to produce $H_2$ and CO, etc. Thus, a mixture of species such as $H_2$, $H_2O$, CO, $CO_2$, and/or $CH_4$ may be produced, and in some cases, produced at or near thermodynamically stable equilibrium.

Oxygen used in this compartment may come from any source and may be in the form of $O_2$ gas (e.g., from air), $H_2O$, $CO_2$, or the like. In some instances, the source of oxygen may also be the outputs of one or more processes within the system. For example, a portion of the flow out of the reaction chamber may be diverted back to the input of the oxidation chamber. The oxygen may have originally entered the reaction chamber, for example, by passing though a membrane that separates the reaction chamber from the water conversion chamber, as described below. In another embodiment, a portion of the flow exiting the cleanup chamber may be used to supply oxygen for gasification within the oxidation chamber. It should be noted that, in some cases, when molecular oxygen is used to gasify fuel, the energy contained in the fuel may be partially consumed. When steam ($H_2O$) or $CO_2$ is used to gasify fuel, the energy of the value can be largely conserved and may actually be increased, as such reactions tend to be endothermic and can recapture heat which can then be converted to additional fuel value in some embodiments. Recirculation of exhaust gases, e.g., from the reaction chamber and/or the cleanup chamber, that result in a reduction of molecular oxygen used to gasify the fuel can result, in many cases, in generally higher system efficiencies. For instance, a reaction chamber may be in fluidic communication with the oxidation chamber via a first conduit and a second conduit, where the first conduit passes reaction products from the oxidation chamber to the reaction chamber, and the second conduit passes products from the reaction chamber to the oxidation chamber.

Within reaction chamber 54, additional oxidation can take place, with oxygen being supplied through material 55 from water conversion chamber 58, discussed in detail below. Material 55 at least partially separates reaction chamber 54 from water conversion chamber 58, and in some cases, such that the contents of water conversion chamber 58 are substantially fluidically isolated from reaction chamber 54. In some embodiments, material 55 may be a conducting ceramic, such as a mixed ionically and electrically conducting material, e.g., as described previously. In some cases, air (not shown) or another oxidant may be introduced into the reaction chamber.

After the reaction, the products from reaction chamber 54 then pass through conduit 64 into cleanup chamber 56. Although cleanup chamber 56 is not necessarily required, often, the reaction within oxidation chamber 52 and/or reaction chamber 54 is not fully complete. In such cases, cleanup chamber may be used to more fully oxidize any residual unoxidized fuel, oxidize CO to form $CO_2$, oxidize soot or other particulates that may have formed, or the like. In some cases, the reaction within cleanup chamber 56 may be facilitated by the introduction of additional air, containing oxygen (or another oxidant), through conduit 66. In one set of embodiments, cleanup chamber 56 and/or conduit 67 exiting cleanup chamber 56 may contain catalysts, sorbents, etc., which can additionally be used to further treat the reaction products. Non-limiting examples are discussed below. The products from this reaction then pass through conduit 67 and are further processed, or are released to the environment, etc.

Also shown in system 50 is water conversion chamber 58. Water from a source of water passes through conduit 68 into water conversion chamber 58. The source of water may be any suitable source, for example, tap water or natural water. In some cases, the water is purified, e.g., the water may be distilled water or deionized water. Within water conversion chamber 58, at least some of the water is reacted to produce hydrogen gas ($H_2$), and oxygen ions ($O^=$), e.g., via in situ electrolysis. The oxygen ions can pass through material 55 to react with fuel in reaction chamber 54, as noted above. The hydrogen, along with any unreacted water, then exits water conversion chamber 58 through conduit 69. This may then be vented, participate in other reactions, separated (e.g., separation of water from hydrogen), etc., and in some cases, at least a portion of the water may be recycled, e.g., using a condenser, as described in detail below.

In some cases, the system is run such that the Nernst potential created across material 55 may be at least about 0.005 V, for example, between about 0 V and about 1.2 V, for example, between about 0.025 V to about 0.5 V, or between about 0.25 V to about 0.5 V. In some embodiments, the potential is at least about 0.025 V and may in certain cases may exceed 0.25 V. In some cases, the potential is not constant, but may vary (e.g., from 0 V at the exit to higher voltages towards the entrance, or the voltage may vary between higher values at either end towards a lower value in the middle). In some cases, a lower water conversion rate (e.g., steam to $H_2$) may allow higher potentials to be reached, since the oxygen partial pressure is higher and the hydrogen yield is higher. However, since more water may be required, the energy costs may also be higher during operation, which may cause a decrease in overall energy efficiency. However, in other cases, a higher water conversion rate may cause an increase in overall energy efficiency.

Without wishing to be bound by any theory, it is believed that determining and/or controlling Nernst potentials is important in some cases for controlling the overall reaction: generally, the Nernst potential is an important measure in electrochemistry because it is directly related to the free enthalpy change of the overall reaction that is taking place. In thermodynamics, the free enthalpy change quantifies both the direction and the tendency for a reaction to proceed from product to reactant. If the free enthalpy change is highly positive then the reaction will not proceed and reactants will remain. If it is somewhat positive or negative, a mixture of product and reactant will remain, and if it is highly negative, mostly product will remain. In connection to this thermodynamic understanding, somewhat positive or negative means that the value of $K=\exp(-\Delta G/(RT))$ is close to unity, and for this purpose, K may be expected to range from about 0.01 to about 100. Here, $\Delta G$ is the free enthalpy change, R is the universal gas constant, and T is the absolute temperature, all in consistent units. Highly positive would mean that K is less than about 0.01, and highly negative that K is greater than about 100. For some of the processes herein, the value of K may range from about 1 to about 1000, which may lead, in certain cases, to a Nernst potential of about 0.025 V to about 0.25 V, respectively. Thus, in some cases, a mixture of reactant and product will remain, and in other cases, the reaction will proceed to the extent that the predominant species is the product. Thus, obtaining a high Nernst potential may be desirable in some embodiments to lead to more product. The Nernst potential (or free enthalpy change) can be determined, in some cases, by the species involved, the concentrations of the species, the pressure, and/or the temperature. For instance, feeding more product to the reaction may lead to higher average Nernst voltages, so increasing the steam flow may increase the hydrogen yield. The higher flow may lead, in such cases, to lower conversion, and therefore increases the required heat exchanger capacity and/or condenser capacity. However, in other embodiments, a low Nernst potential may be desirable, and in still other embodiments, a reaction may proceed without any determination or calculation of the Nernst potential.

It should be noted that the example described above is not intended to be limiting, and can be readily modified by those of ordinary skill in the art, depending on the particular application. For example, more than one set of chambers and/or conduits may be present (e.g., more than one water conversion chamber), and/or other additional chambers may be present (e.g., a catalytic chamber, as is further described below), and/or one or more of the chambers and/or conduits described above may be absent (e.g., in some embodiments, system 50 does not include a cleanup chamber 56). The chambers may also be configured in any position relative to each other. As an example, as discussed below, reaction chamber 54 may contain water conversion chamber 58, although water conversion chamber 58 may be substantially fluidically separate from reaction chamber 54. As another example, oxidation chamber 52 and reaction chamber 54 may be the same chamber, i.e., within the same chamber, a fuel is oxidized by reaction with air, and simultaneously, within the same chamber, oxygen ions formed from the splitting of water react with fuel within the reactor chamber. As still another example, some or all of the above-described chambers may be adjoined or adjacent, rather than separated by discrete conduits, for example, oxidation chamber 52 may be adjacent to cleanup chamber 56, but not in direct fluidic communication with each other, as discussed below. Such designs may be useful in certain applications, for example, to minimize heat loss between chambers, to maximize heat transfer between chambers, to minimize heat loss from the overall system, to minimize distances that materials have to travel between chambers, or the like. In addition, in some cases, one or more of the conduits described above may be connected via heat exchanges, such as those discussed below.

In addition, FIG. 4 is intended to be schematic, and flow of fluids (e.g., fuel, air, reactants, products, etc.) between any of the above-described chambers and conduits may be controlled or regulated, e.g., by blowers, valves, pumps, sensors, controllers, level controllers, fans, turbines, or the like. Non-limiting examples are described in more detail below. Conditions within the system may also be monitored, e.g., by sensors, flowmeters, thermometers, etc., within the chambers and/or within the conduits. Those of ordinary skill in the art will be able to incorporate such devices, sensors, controllers, etc. in an electrochemical system of various embodiments of the invention without an undue degree of experimentation.

Each of the above-described chambers and/or conduits may be constructed out of any suitable material, and the chambers and/or conduits may be composed of the same, and/or different materials. For instance, the chambers and/or conduits can be constructed of ceramic, aluminum, stainless steel, other metals such as copper, or other high-temperature steel, chromium and/or cobalt alloys, or essentially any material that will not destructively interfere with the device or be easily corroded. Other commercial alloys including iron, chrome, nickel, cobalt, and/or other species may be useful, such as Inconels™. These components typically are constructed of non-reactive materials, that is, materials that do not participate in any electrochemical reaction occurring in the system. Of course, all components should be fabricated of material selected to operate effectively at the intended temperature (and temperature variation) to which the component will be exposed.

Figure 5:
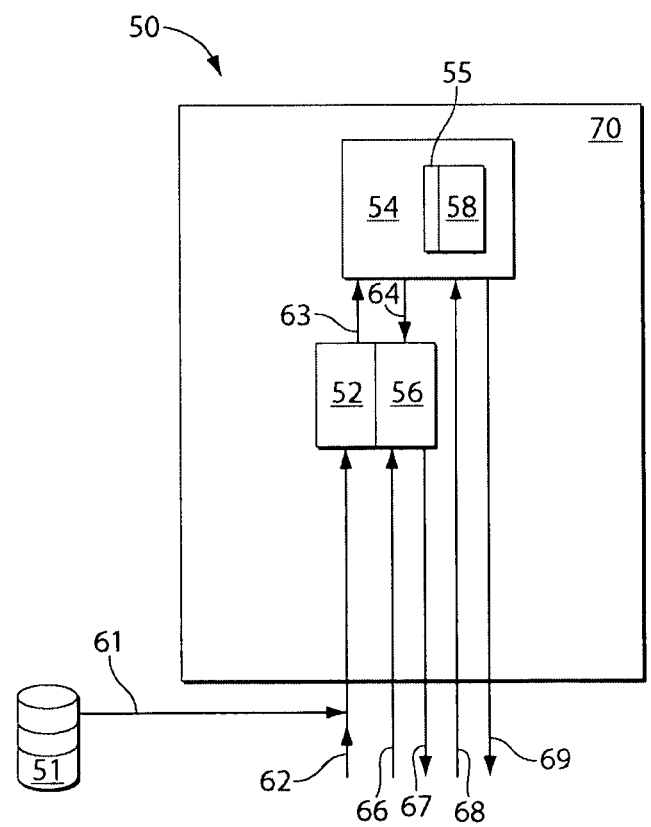
FIG. 5 is another schematic diagram of an embodiment of the invention, showing a housing.

FIG. 5 shows another embodiment of the invention. Components similar to those discussed above with respect to FIG. 4 are shown, but are present in a somewhat different configuration. In FIG. 5, housing 70 contains each of oxidation chamber 52, reaction chamber 54, and cleanup chamber 56. Housing 70 may be used to contain all of the chambers, e.g., for ease of transport or operation, maximization of thermal integration, or as a safety mechanism, for instance, to prevent users of system 50 from coming into contact and/or attempting to alter the chambers. Although housing 70 is shown in this figure as containing all of these chambers, in other embodiments, housing 70 may contain only one or two of oxidation chamber 52, reaction chamber 54, cleanup chamber 56, and/or water conversion chamber 58, depending on the specific application.

Typically, high temperatures are used in system 50. Thus, housing 70 may be insulated in some cases, e.g., to prevent heat loss from the chambers and conduits within housing 70, and/or to prevent users from contact into the high temperatures areas of the device. Additionally, in some cases, some of the chambers within housing 70 may be nested, e.g., higher temperature chambers may be contained within lower temperature chambers. This arrangement may reduce heat loss from these chambers. For example, in FIG. 5, water conversion chamber 58 is contained within reaction chamber 54.

Fuel from a fuel source 51 passes through conduit 61 into oxidation chamber 52. In addition, air passes through conduit 62 and is mixed with the fuel in conduit 61, prior to entering oxidation chamber 52. Although FIG. 5 shows that the fuel in conduit 61 is mixed with the air in conduit 62 prior to entering the burner, in other cases the fuel and air may be fed to the combustion chamber 52 in separate conduits (see, e.g., FIG. 4). Although oxidation chamber 52 is positioned adjacent to cleanup chamber 56, these two chambers are not in direct fluidic communication; however, the two chambers are in thermal communication. The products from the reaction within oxidation chamber 52 pass into reaction chamber 54 through conduit 63. After the reaction within reaction chamber 54, as discussed below, the products then pass through conduit 64, which flows countercurrent to conduit 63 in this example, into cleanup chamber 56. Also shown in FIG. 5 is conduit 66, which transports air into cleanup chamber 56. After reaction within cleanup chamber 56, the products exit cleanup chamber 56 and housing 70 through conduit 67. In one embodiment, housing 70 may be constructed such that gases exiting conduit 67 fill portions of housing 70 prior to exiting, which may further minimize heat loss.

Certain embodiments of the invention can conserve exergy, i.e., by conserving the portion of thermal or chemical energy in any flow that can be converted to useful work. This can be achieved, for instance, by minimizing instances where flows of higher quality (e.g. higher temperature) lose energy directly to flows of lower quality. For example, heat exchangers that flow primarily countercurrent are used in certain embodiments to conserve exergy, because the difference in temperature between the two flows is minimized along the entire length of the heat exchanger. Thus, as discussed in the examples and figures herein, flows that travel countercurrent (e.g., in heat exchangers, across a mixed conducting ceramic material, etc.) can be used to conserve exergy. Of course, it should also be noted that the system as described herein is not limited to only countercurrent flows, and crosscurrent and/or cocurrent flows are used in other embodiments of the invention, e.g., as shown in some of the examples.

In FIG. 5, although water conversion chamber 58 is shown being contained within reaction chamber 54, the chambers are fluidically separated and there is substantially no fluidic communication between water conversion chamber 58 and reaction chamber 54, i.e., fluids such as water and hydrogen within water conversion chamber 58, and cannot readily enter into reaction chamber 54, except through material 55, which may be a conducting ceramic, such as a mixed ionically and electrically conducting material, as previously discussed. Instead, water from a source of water enters water conversion chamber 58 though conduit 68, and exits through conduit 69. Within water conversion chamber 58, at least some of the water is reacted to produce hydrogen gas, and oxygen ions, which are transported across material 55 to reaction chamber 54, as noted above.

In some cases, heat may be exchanged between various conduits within a reactor system, inside and/or outside of a housing, to increase the overall efficiency. For example, FIG. 5 also shows heat exchange between several conduits connecting various chambers within the reactor system. In addition, as noted below, heat exchange may also occur outside of housing 70. As shown here, various conduits are operated in countercurrent flow, relative to each other. The countercurrent flow may be useful in certain embodiments, where control of heat flow is desired, as countercurrent flow of fluids within adjacent or nearby conduits may operate to cause heat exchange between the fluids. Of course, in other embodiments, other arrangements are also possible, e.g., cocurrent or crosscurrent heat exchange, depending on the specific application. It should be understood that throughout this text the term "countercurrent," as used herein, is meant to refer include to flows that are substantially countercurrent and that, in any real system, flows may also have, in some cases, crosscurrent or even cocurrent components. Those of ordinary skill in the art will be aware of heat exchanger configurations for exchanging heat between two or more conduits, as well as suitable heat exchanger devices (e.g., shell-and-tube heat exchangers). For example, conduits 68 and 69 flow countercurrent to each other, and additionally, conduit 68 flows countercurrent to conduits 64 and 67. Conduits 63 and 64 are also in countercurrent heat exchange to each other, as well as conduits 66 and 67. In addition, conduit 61 within housing 70 could be positioned to be in countercurrent heat exchange with conduit 67, in another embodiment.

As a non-limiting, specific example, water within conduit 68 may be heated from ambient temperature to a substantially elevated temperature within water conversion chamber 58, e.g., a temperature at least sufficient to convert the water (or a portion of the water) into steam. The heating of the water may be facilitated through heat exchange with conduit 69, in which water and/or hydrogen at a higher temperature is flowing in a countercurrent direction, as well as countercurrent heat exchange through conduits 64 and/or 67, which are also at higher temperatures than the water initially entering conduit 68.

Figure 6:
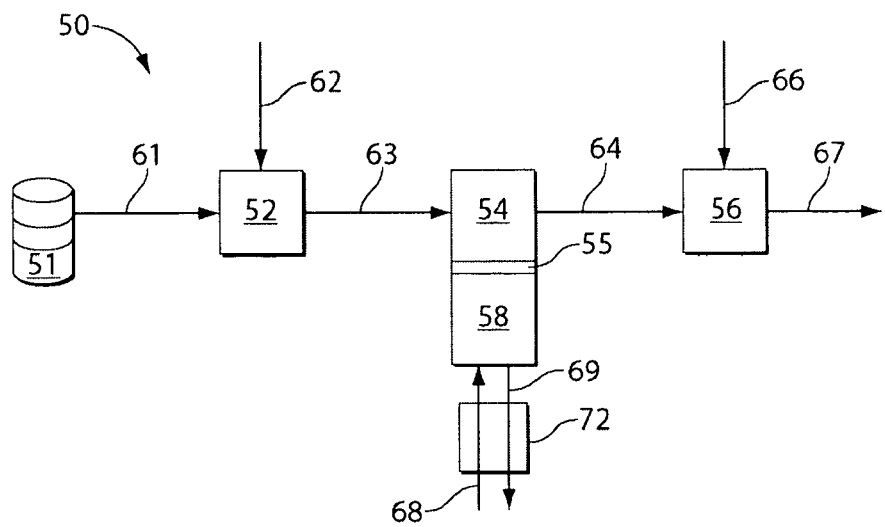
FIG. 6 is yet another schematic diagram of an embodiment of the invention, showing a heat exchanger.

As yet another example, FIG. 6 shows a reaction system, including components similar to those shown in FIGS. 4 and 5. However, in FIG. 6, conduits 68 and 69, which are in fluid communication with water conversion chamber 58, are positioned within a heat exchanger 72, where heat between the entering and existing conduits is transferred. As shown in FIG. 6, these conduits are in countercurrent flow to each other.

In some embodiments, the oxidation chamber and the cleanup chamber may be positioned to be in thermal communication with each other, for example, adjacent to each other, such as is shown in FIG. 5. In this figure, oxidation chamber 52 and cleanup chamber 56 are not in direct fluidic communication with each other. Instead, fluids within oxidation chamber 52, to enter cleanup chamber 56, first pass through reaction chamber 54. Heat produced by the oxidation of fuel in oxidation chamber 52 can pass directly into cleanup chamber 56, e.g., via a wall separating oxidation chamber 52 and cleanup chamber 56. The heat may be used to heat cleanup chamber 56, and in some cases, the heat may be at least sufficient to cause spontaneous ignition and/or oxidation of unreacted fuel and/or other species within cleanup chamber 56. Thus, the ignition and oxidation of reactants within cleanup chamber 56 may occur without the use of a spark plug or other ignition source, according to certain embodiments of the invention.

The ignition (and/or other temperatures) may be monitored, according to certain embodiments, through conventional technologies such as temperature measurement (e.g., measured with a thermocouple), flame conductivity measurement, or infrared sensing. For instance, the use of audio waves may be used for flame monitoring, such as a particular frequency spectrum and/or sound intensity produced by the waves.

In some embodiments, the reaction of air and fuel in the oxidation chamber may be laminar, although it need not be. Laminar flow may be useful, in certain cases to control the reaction rate between the air and the fuel, and/or to decrease noise produced by the oxidation chamber. Without wishing to be bound by any theory, it is believed that increased noise results when flow within the oxidation chamber is turbulent. Accordingly, by designing the oxidation chamber such that flow within the oxidation chamber is laminar, i.e., has a suitably low Reynolds number, flow of air and/or fuel within the oxidation chamber may be controlled to be laminar. In one set of embodiments, the oxidation chamber may have the shape of a pipe and/or the chamber may be extended through a pipe or other conduit, in which flow of fluid (fuel and air) through the pipe or conduit is laminar. Thus, in some cases, the oxidation reaction may occur not only in the oxidation chamber, but in the pipe or conduit as well.

In some embodiments, a catalyst or other species may be used to facilitate processing, and such catalysts may be present anywhere in the system, for example, inside or outside of a housing, inside a reactor chamber, etc. For example, in one embodiment, a CO-reacting species, such as oxygen, may be used to facilitate oxidation of CO (carbon monoxide) into $CO_2$ (carbon dioxide). It may be desirable to reduce the amount of CO being produced by the system in some cases, for example, if the gas is vented to the atmosphere, such as to a room where people are present. In some cases, the amount of CO produced by the device must be kept within certain minimum requirements. Accordingly, a catalyst, or other species able to react with CO, may be useful in achieving these goals, and the catalyst or other CO-reacting species may be positioned anywhere, e.g., in fluidic communication with the cleanup chamber, within a housing containing the reaction chamber, within a conduit, etc. One example of a potentially suitable catalyst is ruthenium, which may be present on an alumina support. In some cases, such a catalyst may catalyze a water-gas shift reaction is as follows:

$$H_2O + CO \rightleftharpoons H_2 + CO_2.$$

Other CO catalysts or CO-reacting species may be used as well, in other embodiments of the invention. In certain instances, a catalyst may be used to promote the partial oxidation of a fuel prior to and/or immediately upon the fuel entering the reaction chamber. In some cases, an activated carbon bed may be used to adsorb sulfur dioxide ($SO_2$) prior to reaction of the CO-reacting species. $SO_2$, in some cases, may poison the ruthenium catalyst.

In another embodiment, a catalyst or other species may be used to remove particulates and contaminants. For example, ceria or other, similar catalytic materials may be used to remove particulates and contaminants from an outflow of the device, e.g., from conduit 67 in FIG. 4. In some cases, a catalyst or other species may oxidize or promote the oxidation of particulates and/or contaminates in the outflow of the device. In some cases, the ceria or other catalyst may be deposited on a ceramic material, for example, alumina or other materials known to those of ordinary skill in the art. Such materials may be useful, for example, in cases where the materials may be exposed to relatively high temperatures. In some embodiments, the ceramic may be porous, and in one embodiment, the porous ceramic may be shaped to form a series of passages to allow fluid flow to occur, e.g., having a "honeycomb" or a "lattice" structure.

Figure 7:
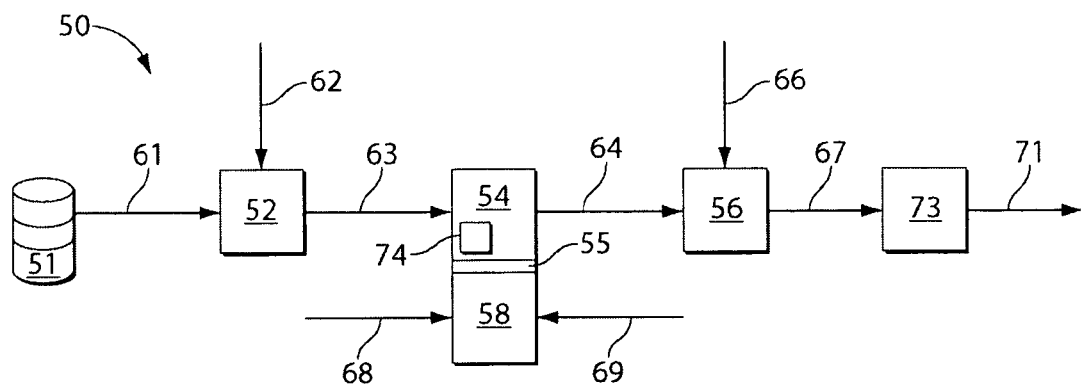
FIG. 7 is still another schematic diagram of an embodiment of the invention, showing a catalyst.

As mentioned above, the catalyst or other species may be positioned anywhere in the system. As an example, FIG. 7 shows a system having components similar to those discussed above with respect to FIG. 4, but further includes catalyst 74, shown positioned within reaction chamber 58 (e.g., such that the reactants within reaction chamber 54 are in contact with catalyst 74), while conduit 67 from cleanup chamber 56 enters catalyst chamber 73, containing a catalyst, before exiting through conduit 71. Thus, catalyst chamber 73 is in direct fluidic communication with cleanup chamber 56 through conduit 67. Of course, FIG. 7 is by way of illustration only, and in other cases, only one of catalysts 74 or 73 may be present, and/or there may be additional catalysts present. For example, in some embodiments, a catalyst may be contained within conduit 64, within conduit 63, and/or within oxidation chamber 52, etc.

Other non-limiting examples of catalysts include platinum, other platinum-group metals, cerias, doped cerias, and mixtures thereof. Such catalysts may also serve to, in some instances, promote the full oxidation of partially oxidized hydrocarbons, nitrogen compounds, oxygen compounds, and/or radicals thereof that can be created during combustion and that may, in some cases, be considered pollutants upon release to the ambient environment, where such undesirable species may include but are not limited to $C_2H_4$, $CH_4$, $OH^-$, $H_2O_2$, $O_3$, NO, $NO_2$, $NO_3$, $H_2S$, SO, etc.

Figure 8:
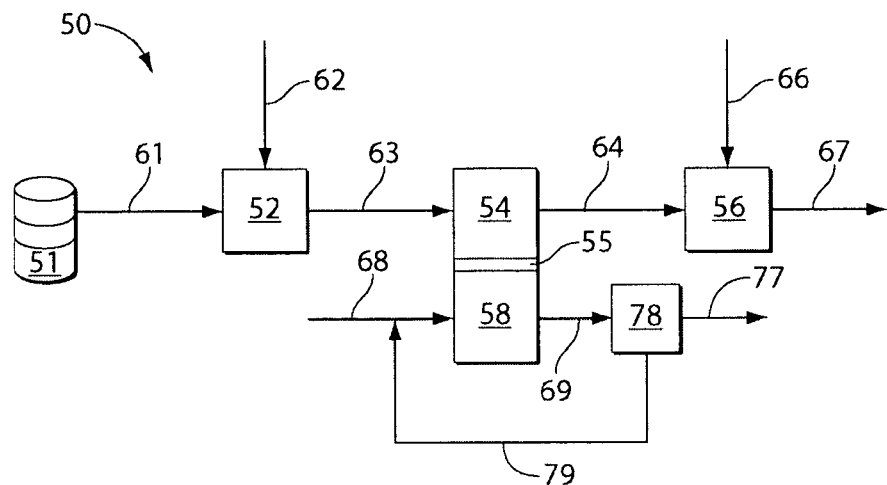
FIG. 8 is yet another schematic diagram of an embodiment of the invention, showing a condenser.
Figure 14:
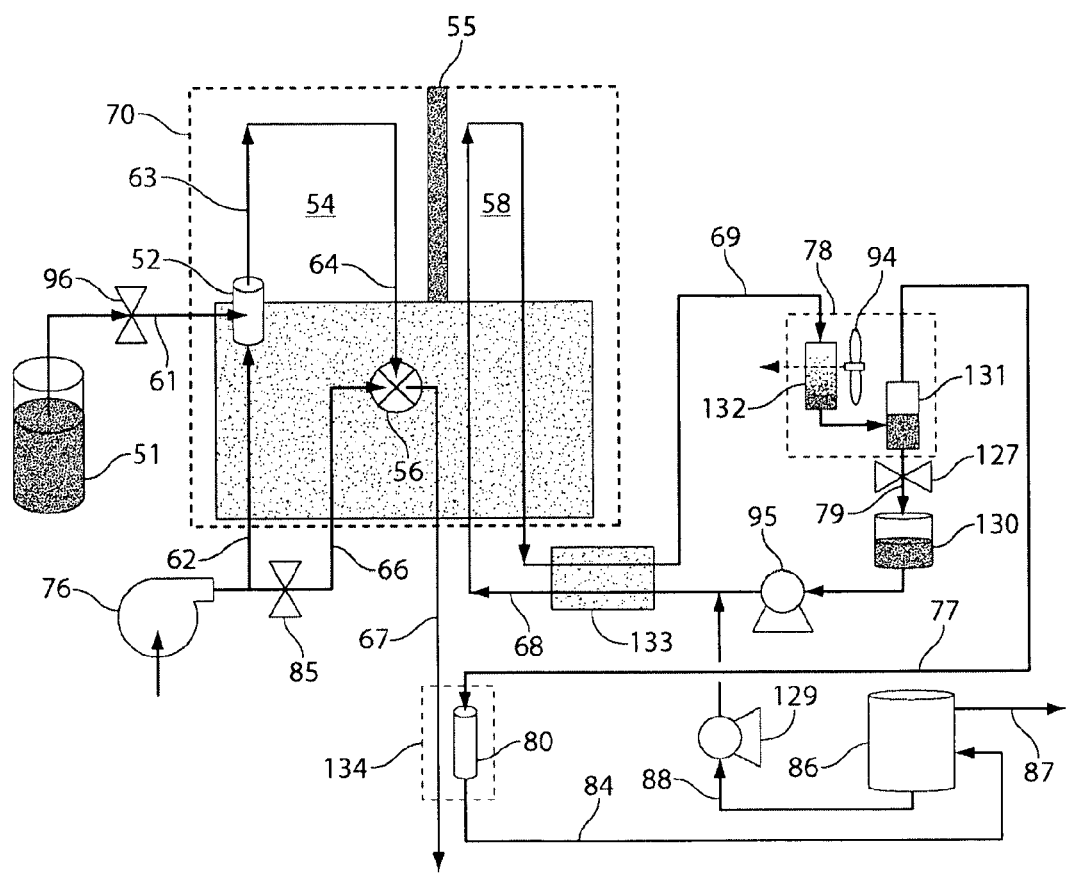
FIG. 14 is another schematic diagram, showing a system according to one embodiment of the invention.

In some embodiments, a condenser or other separation device may be used to separate hydrogen produced in a water conversion chamber from unreacted water that may still be present. In some cases, the unreacted water may be recirculated back into the water conversion chamber, for instance, via a water storage reservoir 130 such as is shown in FIG. 14. An example of such a condenser is shown in FIG. 8, which shows a system including components similar to those discussed above with respect to FIG. 4. FIG. 8 also shows a condenser 78, in to which fluids exiting water conversion chamber 58 through conduit 69 enter. The condenser may be used to separate hydrogen gas from water. In one set of embodiments, as a non-limiting example, the condenser may cool the mixture exiting water conversion chamber 58 to a temperature less than the boiling point of water (i.e., at the pressure that the water is at, e.g., 100° C. if the pressure in the condenser is at ambient pressure). At these temperatures, the water (which is present as steam) may condense to form liquid water, while the hydrogen remains in a gaseous state. The hydrogen gas and the water can then be readily separated, and the water, in some cases, may be recycled through conduit 79 back to water conversion chamber 58, stored for later use in a water storage reservoir (e.g., within water storage reservoir 130 in FIG. 14), disposed of, or otherwise used (e.g., in other processes). If it not enough water is recirculated from condenser 58, additional water may be added, i.e., from an internal reservoir (e.g., reservoir 130 in FIG. 14), an external source, or in some cases, from water produced through the oxidation of the fuel and/or the hydrogen gas, as is noted in more detail below, or through the condensation and subsequent purification of water found in the oxidized fuel stream exiting conduit 67. Similarly, the hydrogen may exit through conduit 77 and be stored and collected (e.g., within pressure reservoir 86 in FIG. 14), reacted to produce electrical energy (e.g., as described herein), or the like.

It should be understood that the condenser may, in some cases, comprise two or more components. For instance, in one embodiment, the condenser may include a first component which is able to condense liquid water from the stream by cooling the stream, and a second component which separates liquid water from the remaining gas stream. As a non-limiting example, FIG. 14 illustrates a condenser 78 that includes a cooling device (e.g., a heat exchanger, or a radiator 132 that is assisted with fan 94 as is shown in the figure), and knock-out tank 131 (which is able to separate liquid water from the remaining gases, e.g. due to gravity). Those of ordinary skill in the art will be aware of other condenser designs that may be used and implemented without an undue degree of experimentation.

Figure 9:
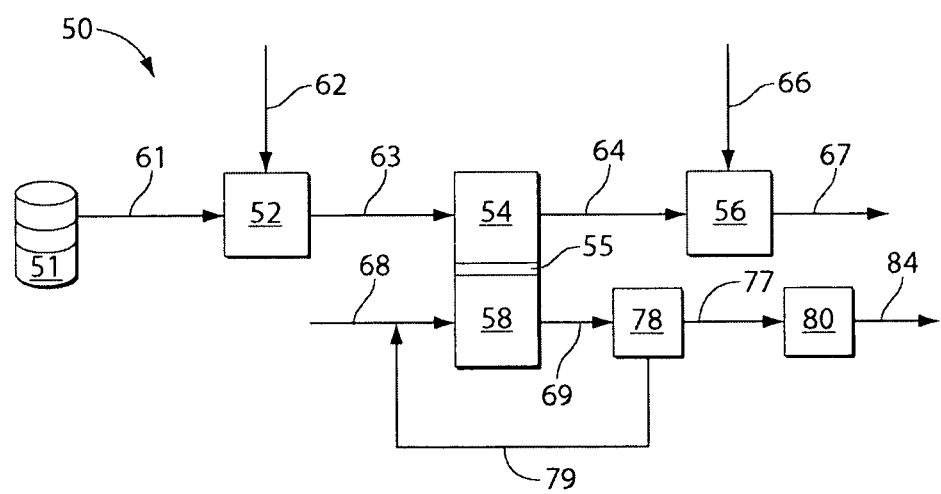
FIG. 9 is still another schematic diagram of an embodiment of the invention, showing a polishing chamber.

In some cases, conduit 77 may contain not only hydrogen, but other gases such as CO, $CO_2$, $H_2$, $H_2O$, or the like. Thus, in one set of embodiments, the gases in conduit 77 may be directed to a polishing chamber 80, before the gases exit in conduit 84, as is shown in FIG. 9. Within polishing chamber 80, CO and/or $H_2$ may be reacted, e.g., to form $CH_4$ or other species. For instance, a methanation reaction such as $CO+3H_2 \rightarrow CH_4+H_2O$ may be catalyzed within polishing chamber 80 using a catalyst such as a ruthenium catalyst or a platinum catalyst. Catalysts suitable for catalyzing methanation reactions are known to those of ordinary skill in the art, and are commercially available.

Figure 10:
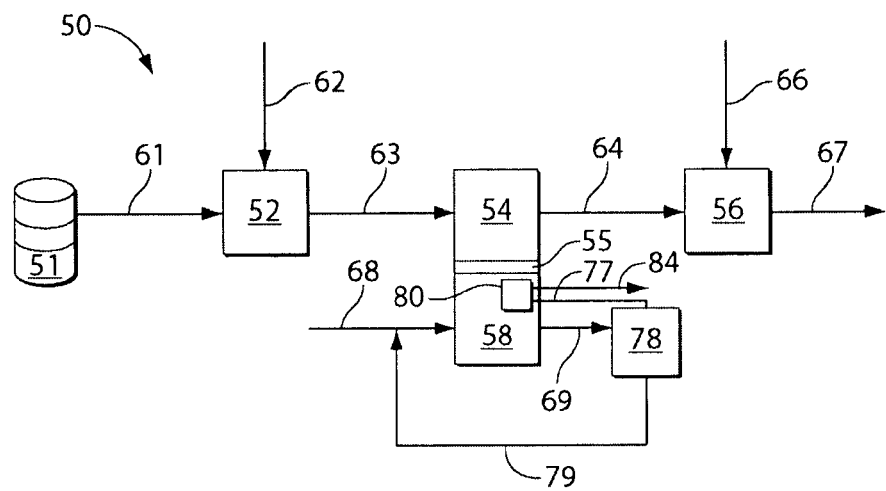
FIG. 10 is another schematic diagram of an embodiment of the invention, showing a polishing chamber.
Figure 11:
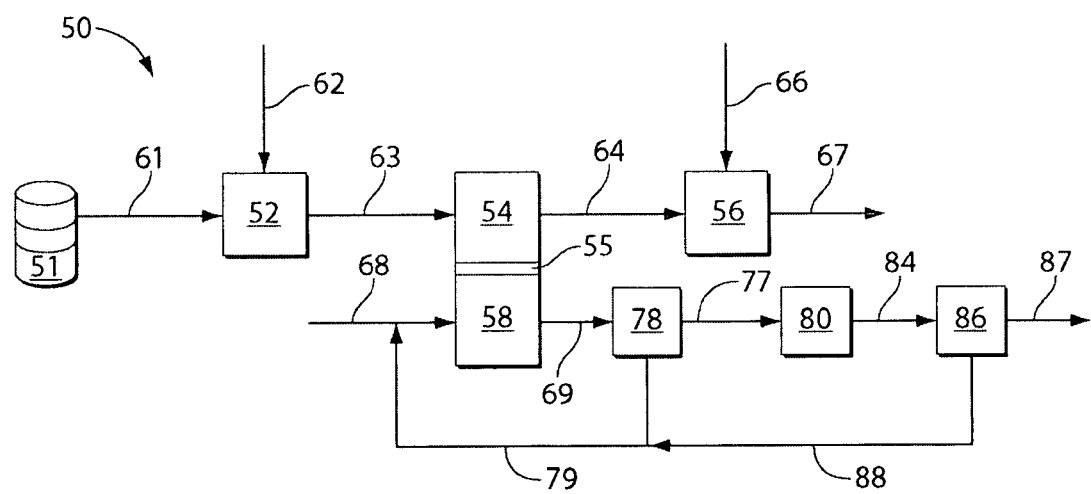
FIG. 11 is a schematic diagram of another embodiment of the invention, showing a pressure reservoir.

In some cases, the reaction within the polishing chamber may occur at relatively high temperatures. For instance, the methanation reaction may be run at temperatures of at least about 75° C., at least about 100° C., at least about 150° C., at least about 200° C., at least about 300° C., or at least about 400° C. In one set of embodiments, for example, now referring to FIG. 10, polishing chamber 80 may be contained within reaction chamber 54 and/or within water conversion chamber 58. Heat from these chambers may be used to at least partially heat polishing chamber 80. In certain embodiments, polishing chamber 80 may be in thermal communication with the fluids in conduit 67, which may have, in some cases, sufficient remaining thermal energy to maintain polishing chamber 80 at or above a desired operating temperature. As a non-limiting example, FIG. 14 shows polishing chamber 80 in thermal communication with conduit 67 via heat exchanger 134. Of course, polishing chamber 80 may, in some embodiments, simply be placed within conduit 67, thus not necessitating a separate heat exchanger, or polishing chamber 80 may be positioned in other locations within the system. Polishing chamber 80 may also be in thermal communication with the overall housing 70 in some cases. In certain embodiments of the invention, the polishing chamber may be in thermal communication with any part of the device that can provide enough thermal energy at a sufficiently high temperature to maintain the polishing chamber at or above the desired operating temperature.

It should also be noted that polishing chamber 80 can, in some embodiments, be placed in line with the flow prior to the condenser such as conduit 69 instead of conduit 77, as is shown in FIG. 14. In some cases the gas stream flowing in conduit 69 may be of sufficiently high temperature that little or substantially no additional thermal energy is needed to keep the polishing chamber at a desired operating temperature. However, in some cases, since the methanation reaction has water as a product, the presence of water vapor in the stream may alter the thermodynamic equilibrium of the methanation reaction, which can reduce the amount of CO that gets converted to methane. Accordingly, placing the polishing chamber 80 after the condenser may lower the concentration of water entering the polishing chamber in some cases, which may allow more reaction to occur, lowering the resulting concentration of CO exiting the polishing chamber and/or broadening the temperature range in which the polishing chamber may be used.

In some embodiments, a pressure reservoir may used to store hydrogen (e.g., at a desired pressure) and/or at least partially separate the exiting gases. For instance, referring now to FIG. 14, water within conduit 84 (e.g., from a methanation reaction, as described herein) may be separated by pressure reservoir 86 and directed via conduit 88 back to conduit 68 and/or water conversion chamber 58. Separation may occur within pressure reservoir 86, e.g., due to changes in pressure, which can cause condensation of water in some cases, and/or due to reductions in temperature (e.g., via condenser 78). The pressure within the pressure reservoir may be controlled, for instance, to maintain a relatively steady or controlled pressure of gas (e.g., $H_2$) exiting pressure vessel 86 in conduit 87. In some cases, the pressure may be controlled by increasing or decreasing the amount of water that is fed into water conversion chamber 58 via conduit 68.

The exiting stream exiting through conduit 69 (and in some cases, in the conduits and chambers downstream of conduit 69 towards conduit 87) may be at least partially reducing due to the presence of $H_2$. Use of a reducing fluid may be advantageous in some cases, for instance, in protecting various components from oxidation, including those described above, such as material 55, or the conduits, joints, etc., and/or further downstream equipment. As a specific, non-limiting example, at least a portion of the $H_2$ may be directed to a fuel cell, and/or the reducing nature of the $H_2$ gas may be useful in protecting various components (e.g., material 55, or a catalyst, such as a nickel catalyst) from oxidation.

Water in conduit 68 can become steam as it heats up and travels through conduit 68 into water conversion chamber 58. The steam can become fairly corrosive in the absence of hydrogen. Components of chamber 58 including the metallic components of the porous materials that support mixed conducting material 55, and/or other components (metallic or otherwise), contained within housing 70, may thus be subject to oxidation by steam. As a portion of the water may be reduced to hydrogen on material 55 in water conversion chamber 58, this flow may become sufficiently reducing to not cause substantial corrosion or oxidation. In some cases, introducing hydrogen into the water stream, within conduit 68 and upstream of housing 70, may keep the flow within chamber 58, conduit 68, and/or conduit 69 at sufficiently reducing conditions to protect the components of the device from oxidation and/or corrosion. Thus, some components contained within housing 70 may be protected from oxidation in those locations upstream from where a sufficient amount of hydrogen has been generated to protect those components from oxidation or corrosion.

As another non-limiting example, in FIG. 14, pump 129 may be used to recirculate a portion of the hydrogen generated by the device back into conduit 68 via conduit 88, which is some cases may be connected to the bottom of pressure reservoir 86. It should be noted that pump 129 may recirculate water that may accumulate in the bottom of pressure reservoir 86 back into conduit 68. Pump 129 also may, in some cases, pump gaseous hydrogen into conduit 68 where it is allowed to mix with the water being pumped into conduit 68 by pump 95. Because of the presence of hydrogen, the water-hydrogen mixture may be made to be sufficiently reducing in conduit 68 such that components exposed to such flow may be at least partially or fully protected from oxidation and/or corrosion.

Some embodiments of the invention also include controllers for any of the above-described systems. For instance, the present invention may include a sensor and/or a controller for controlling operation of the system. The sensor may be a sensor capable of monitoring or sensing one or more properties of the system, such as one or more properties of the oxidation chamber, the reaction chamber, the cleanup chamber, the water conversion chamber, the condenser, the airflow device, etc., and/or any associated conduits. The controller may control, in some cases, one or more properties of the system based upon this monitoring. Examples of properties that may be monitored and/or controlled include, but are not limited to, fuel feed rate, temperature profile of the fuel feed system, oxygen concentration, fuel concentration, operating temperature, contaminant concentration, water temperature, fuel composition, hydrogen concentration, fuel heating rates, temperature profile, air or oxygen feed rate, oxygen concentration in the feed or in the exhaust, exhaust composition, voltage, current, resistance, AC impedance profile, power output, fuel efficiency, or the like.

The controller may operate by any mechanism that provides the desired control of the system. For example, the controller may include digital, analog, or digital and analog systems. Control of the system may be centralized in a single controller, which may be simple, reliable, and/or inexpensive. It should be understood, however, that multiple controllers may be used, for example, a first controller may be used to control airflow and/or fuel entry, while a second controller may be used to control water entry. Such separate control may result, in some cases, in better control of each of the components of the system, as the fuel and the water do not come into direct physical contact with each other in the system in many embodiments, and only interact via a material (e.g., separating a reaction chamber from a water conversion chamber), for instance, a conducting ceramic, such as a mixed ionically and electrically conducting material, e.g., as described previously. Accordingly, entry of fuel within the system may also be controlled, in some embodiments, independently of the entry of water into the device.

The controller may, for example, receive input signals, modify these signals, and provide output signals. The input signals may come from any part of electrochemical system where it is desired to measure a property, e.g., via a sensor. Similarly, output signals may be sent to any part of the system where it is desired to control a property, e.g., a pump, a valve, a blower, or the like. In some instances, a property or group of properties may be monitored or controlled indirectly by monitoring or controlling a related property or group of properties, as will be discussed in greater detail below.

Input signals and output signals to and from the controller may be any type of signal and may be sent via any appropriate medium. For example, input and output signals may be pneumatic signals carried by tubing, analog electrical signals carried by conductive wires, digital electrical signals carried by conductive wires, or optical signals carried by fiber optic cables. Combinations of signal types and other signal types are also possible. In some cases, signals may share transfer media. For example, a pump may provide both input and output signals via a single connection, such as an electrical cable.

In one embodiment, airflow to a system of the invention, e.g., to an oxidation chamber and a cleanup chamber, may be controlled such that there is a substantially stoichiometric amount of oxygen within the system able to react with fuel entering from a fuel source. The system may be run stoichiometrically, in some cases, to maximize efficiency, as an excessive amount of air may require additional, unnecessary heating capacity, while an excessive amount of fuel may result in unreacted fuel and loss of efficiency. However, in other cases, the system may be run under non-stoichiometric conditions. For instance, if cooling of the device is required, excess air may be brought into the system in order to effect cooling.

In some cases, airflow into a system of the invention is controlled such that the amount of oxygen within the air is substantially stoichiometric to the amount of fuel entering the system. Those of ordinary skill in the art will be able to determine an appropriate amount of air (or other oxidant), and an appropriate amount of oxygen, for a given fuel that is entering the device. In other cases, however, the system may not be run stoichiometrically. Those of ordinary skill in the art will be able to determine the rate of entry of air (or other oxidant), and hence the rate of entry of oxygen, into the system based on the rate of entry of fuel. In some cases, the flow of air may be directed into both the oxidation chamber and the cleanup chamber, e.g., as previously described, although the total amount of entering air may be substantially stoichiometric to the amount of fuel entering the system. Generally, speaking, the flow of oxygen and fuel are substantially stoichiometric when a substantial percentage of the oxygen entering the system is used to oxidize the fuel, for example, at least about 75%, at least about 80%, at least about 85%, at least about 90%, at least about 92%, at least about 94%, at least about 95%, at least about 96%, at least about 97%, at least about 98%, or at least about 99% of the oxygen has been used to oxidize the fuel.

Figure 12:
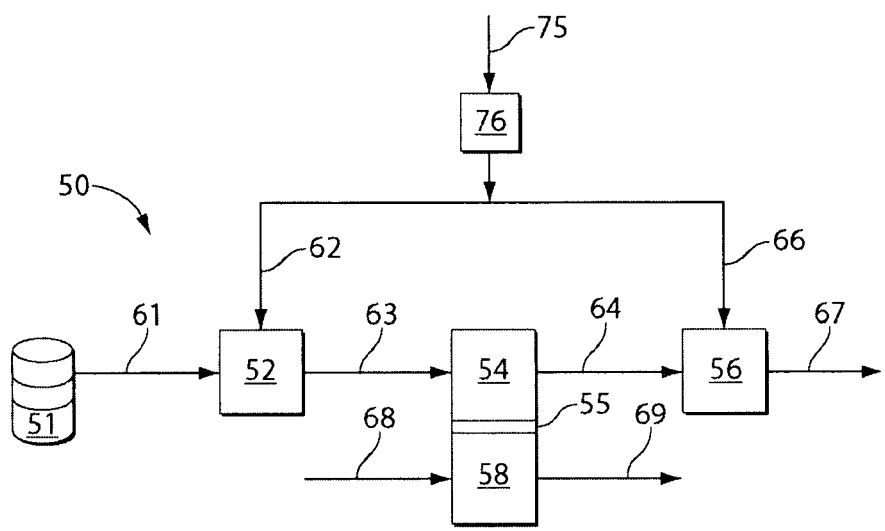
FIG. 12 is still another schematic diagram of an embodiment of the invention, showing a common airflow device.

In another embodiment, airflow to both the oxidation chamber and the cleanup chamber are controlled by a common airflow device that is able to direct air to both chambers. The common airflow device may be, for example, a blower, a fan, a turbine, or the like. One non-limiting example is shown in FIG. 12, which shows a system 50 having components similar to those discussed above with respect to FIG. 4, in which air from conduit 75 is directed through a common airflow device 76 to each of oxidation chamber 52 and cleanup chamber 56 along conduits 62 and 66, respectively. In some cases, a common airflow device may be advantageous, for example, to allow better control of airflow into system 50, and/or as a safety feature. For instance, if two airflow devices were used to separately independently control airflow into oxidation chamber 52 and cleanup chamber 56, problems with one airflow system could cause air to backflow into the other airflow system. However, by the use of a common airflow device, this problem can be avoided.

In addition, the ratio of air flowing into each of oxidation chamber 52 and cleanup chamber 56 from common airflow device 76 may be controlled through valves, pumps, or the like that are positioned on one or both of conduits 62 and 66, respectively. For instance, a valve positioned on conduit 66 (not shown) may control airflow into cleanup chamber 56, and, while the total amount of air entering the system through common airflow device 76 may be held constant, the ratio of the amount of air entering cleanup chamber 56 versus the amount entering oxidation chamber 52 may be controlled using the valve.

In one set of embodiments, the system may be started up from a "cold" state (i.e., where the system is not being used) by initially directing all of the air and fuel into the oxidation chamber, until the oxidation chamber has reached a predetermined temperature or other predetermined condition, before directing air to the cleanup chamber as well. However, in some cases, the total amount of air entering the system may be controlled such that the amount of oxygen within the air is substantially stoichiometric to the amount of fuel entering the system. By initially directing airflow substantially into the oxidation chamber, the oxidation chamber may be "warmed up" more quickly, i.e., until the desired temperature is reached. If the various conduits and chambers within housing 70 are indirect or indirect thermal communication, substantially all of the components contained within housing 70 may be warmed up in some cases. Once a desired temperature or other predetermined condition has been reached, airflow may also be partially or fully diverted into the cleanup chamber, e.g., to more fully oxidize any residual unoxidized fuel, oxidize CO to form $CO_2$, oxidize soot or other particulates that may have formed, etc. In some embodiments, the amount of diversion of airflow to the cleanup chamber can be varied continuously and/or at a rate sufficient to control the temperature as a function of time of some or all of the components within housing 70, e.g., in order to approximate a desired time vs. temperature profile. As a specific, non-limiting example, a common blower is used to direct air to both the oxidation chamber and the cleanup chamber, while a valve or other device is used to control the ratio of airflow between the oxidation chamber and the cleanup chamber.

Figure 13:
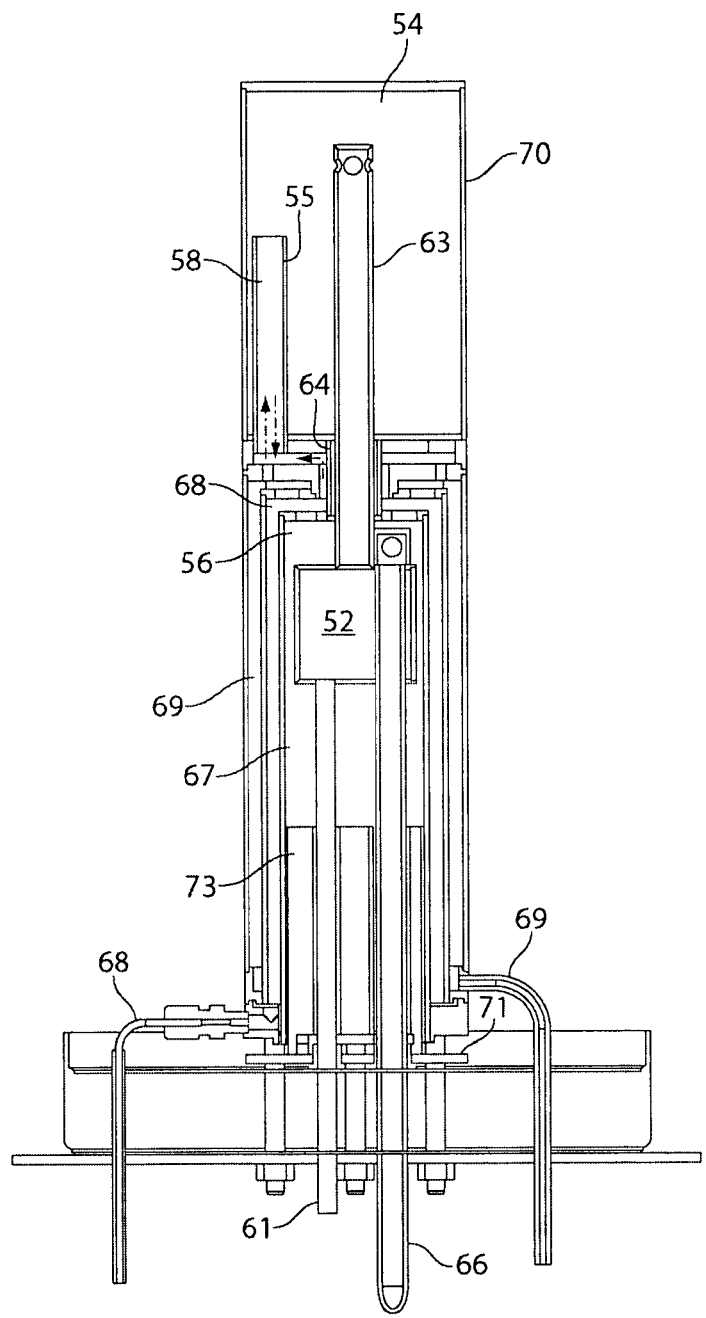
FIG. 13 is a schematic diagram of another embodiment of the invention.

A non-limiting example of a housing containing several chambers is shown in FIG. 13. In this figure, housing 70 includes an oxidation chamber 52, a reaction chamber 54, and a cleanup chamber 56. Fuel from a source of fuel mixes with air and pass through conduit 61 into oxidation chamber 52. Reaction (partial oxidation) between the fuel and air occurs in oxidation chamber 52, and in some cases, in conduit 63 (e.g., if the reaction occurs under laminar conditions). In some cases, the reaction is initiated by a spark-producing device (not shown). From conduit 63, the products enter reaction chamber 54.

Products from reaction chamber 54 pass through conduit 64 to cleanup chamber 56. Cleanup chamber is also fed by air through conduit 66. As shown in FIG. 13, cleanup chamber 56 is not in direct fluidic communication with oxidation chamber 52, but the two chambers are positioned adjacent to each other and are in thermal communication. From cleanup chamber 56, product passes through conduit 67 to catalyst 73, which may be, for example, ceria impregnated on a porous alumina monolith. Note that conduit 67 flows countercurrent to conduit 61, and heat exchange between the two conduits can occur. Finally, the products exit housing 70 through conduit 71.

In addition, contained within reaction chamber 54, but not in fluidic communication, is water conversion chamber 58. These chambers are separated, at least in part, by material 55, which may be a conducting ceramic, such as a mixed ionically and electrically conducting material as described herein. Water enters housing 70 through conduit 68, and exits through conduit 69. Conduits 68 and 69 flow countercurrent to each other; in addition, conduit 68 flows countercurrent to conduit 64 and 67. Thus, heat exchange can occur between these conduits. As discussed above, within water conversion chamber 58, water may be reduced to hydrogen gas, while oxygen that is produced from the reduction of water is transported across material 55 to reaction chamber 54, where it can react with the fuel.

A non-limiting example of a system of the invention is shown in FIG. 14. In this figure, a fuel (e.g. propane) in fuel source 51, controlled by fuel control valve 96, is directed through conduit 61 to oxidation chamber 52 contained within housing 70. An airflow device 76 also directs air into oxidation chamber 52 via conduit 62. The products from oxidation chamber 52 flow through conduit 63 into reaction chamber 54, on one side of material 55, e.g., a membrane. In reaction chamber 54, additional oxidation of the fuel occurs, with oxygen being supplied through material 55 from water conversion chamber 58. The products from the reaction pass through conduit 64 into cleanup chamber 56. Also entering cleanup chamber 56 is air from airflow device 76, controlled via valve 85. Cleanup chamber may be used to more fully oxidize any residual unoxidized or partially oxidized fuel, oxidize CO to form $CO_2$, oxidize soot dr other particulates that may have formed, or the like. Gases exiting cleanup chamber 56 then leave housing 70 via conduit 67.

Water enters water conversion chamber 58 within reactor 70 via conduit 68. The flow within conduit 68 may be controlled by controller 95, which may be, for instance, a pump. Within water conversion chamber 58, some of the water may be converted into hydrogen. The water and hydrogen exit water conversion chamber 58 and housing 70 through conduit 69, passing through counter flowing heat exchanger 133, and entering condenser 78. The water is cooled via cooling device 94 (e.g., a fan), and a portion of the water liquefies and exits via conduit 79 controlled by valve 127 returning to reservoir 130. Heat exchanger 133 may be, for instance, a separate heat exchanger that may be added in certain embodiments in order to recuperate heat contained within the water hydrogen stream exiting in conduit 69, and/or the heat exchanger may use a portion of such thermal energy to pre-heat the flow in conduit 68 prior to entering housing 70. Such recuperation can increase the overall thermodynamic efficiency of the overall hydrogen generation process in some instances. Water can be moved from reservoir 130 with the use of controller 95 (e.g. a pump) through conduit 68, as discussed herein.

Gases, including water and hydrogen, exit condenser 78 via conduit 77 into polishing chamber 80. Polishing chamber 80 is shown contained within heat exchange assembly 134 such that the polishing chamber in thermal communication with the exhaust stream in conduit 67. As previously discussed, the polishing chamber can be placed in any location within the device, e.g., in a position that can provide sufficient heat flow to the polishing chamber to keep the polishing chamber within the desired operating temperature range such as within housing 70. Within polishing chamber 80, CO and/or $H_2$ may be reacted, e.g., to form $CH_4$ or other species. For instance, a methanation reaction such as $CO + 3H_2 \rightarrow CH_4 + H_2O$ may be catalyzed within polishing chamber 80. Gases leaving polishing chamber 80 then can pass via conduit 84 into pressure reservoir 86. Within pressure reservoir 86, hydrogen gas may be further separated from the water and the hydrogen leaves pressure reservoir 86 through conduit 87. Example downstream uses for the hydrogen in conduit 87 include use within a fuel cell, chemical reaction, purification, or the like. Pump 129 may be used to recirculate a portion of the hydrogen generated by the device back into conduit 68 via conduit 88, which is some cases may be connected to the bottom of pressure reservoir 86.

Pump 129 may be able to recirculate small amounts of water which may accumulate in the bottom of vessel 86 back into conduit 68, and/or pump 129 may pump gaseous hydrogen into conduit 68, where it can mix with the water being pumped into conduit 68 by pump 95. Because of the presence of hydrogen, the water-hydrogen mixture may be sufficiently reducing in conduit 68 and/or within water conversion chamber 58 such that components exposed to such flow may be substantially protected from oxidation and/or corrosion. It should also be noted, however, that in some cases, pump 129 may not be present. For instance, in one embodiment, pump 129 can potentially be eliminated by the incorporation of an eductor (also known as a venturi pump) at the intersection of conduit 68 and conduit 88. Flow downstream of pump 95 can be diverted through a venturi that can be used to create a low pressure that may draw hydrogen and liquid water from pressure reservoir 86 through conduit 88 and into conduit 68.

Figure 15:
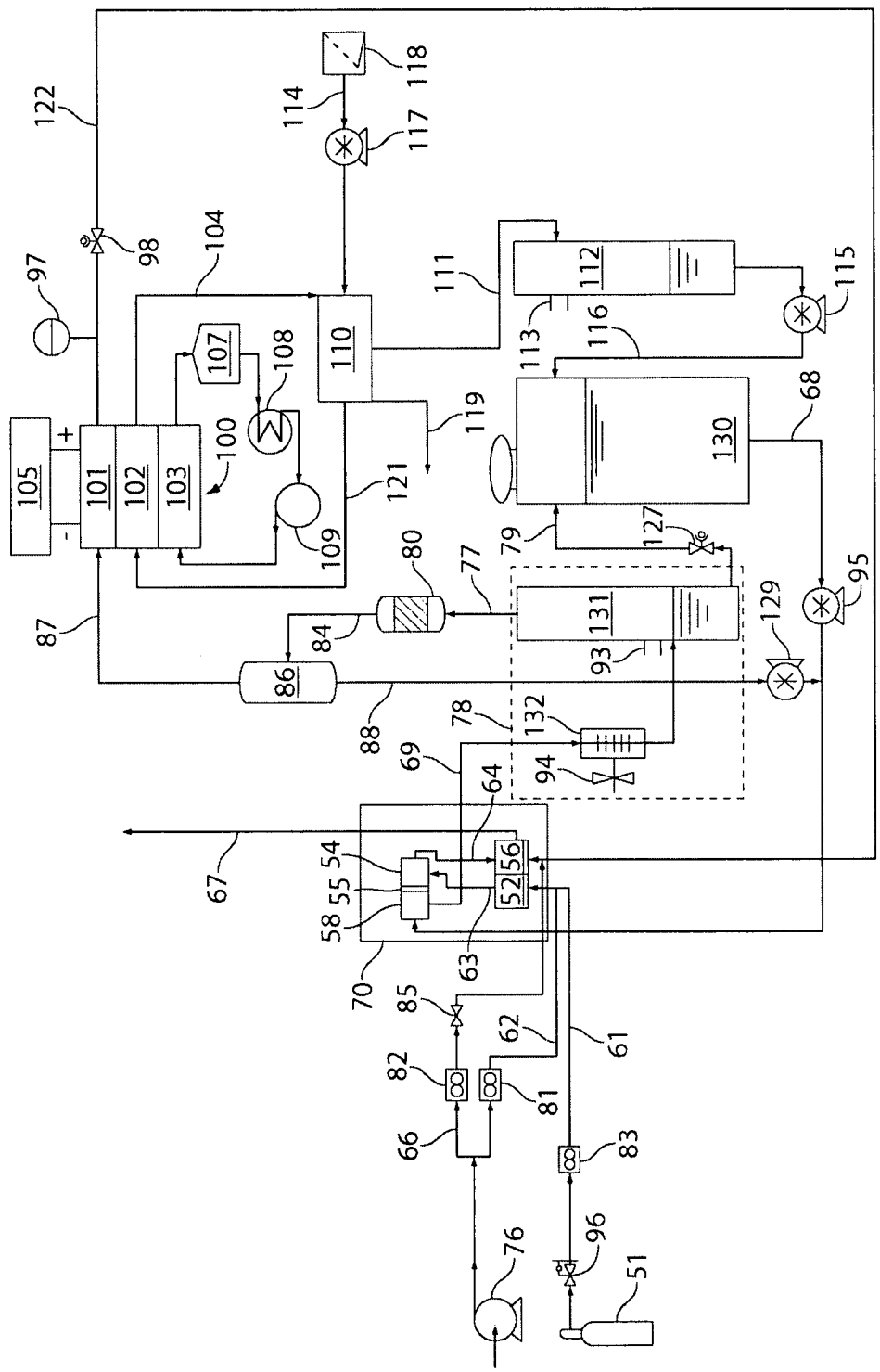
FIG. 15 is another schematic diagram, showing a system according to another embodiment of the invention.

Another non-limiting example of a system of the invention is shown in FIG. 15. In FIG. 15, fuel from fuel source 51 passes through conduit 61 to oxidation chamber 52. The flow of fuel within conduit 61 is monitored by a flow indicator 83, and is controlled by a variable solenoid 96 in this example. The fuel flows into housing 70, which contains oxidation chamber 52, as well as reaction chamber 54 and water conversion chamber 58, separated by material 55, which can be a conducting ceramic or a mixed ionically and electrically conducting material, as previously described. Material 55 at least partially separates reaction chamber 54 from water conversion chamber 58, and in some cases, such that the contents of water conversion chamber 58 are substantially fluidically isolated from reaction chamber 54. The products from oxidation chamber 52 flow via conduit 63 into reaction chamber 54, then through conduit 64 to cleanup chamber 56, and are eventually released to the environment through conduit 67. In reaction chamber 54, additional oxidation of the fuel occurs, with oxygen being supplied through material 55 from water conversion chamber 58. Before exiting conduit 67, however, the products may pass through conduits within housing 70, e.g., along the perimeter of housing 70, which may reduce heat loss from housing 70 and the chambers contained therein, e.g., due to smaller temperature changes between the outside of housing 70, and the inner chambers contained within the housing. Also, in FIG. 15, oxidation chamber 52 is positioned adjacent to cleanup chamber 56. As shown here, these two chambers are not in direct fluidic communication, although the two chambers are in thermal communication. In some cases, heat from oxidation chamber 52 may be at least sufficient to cause spontaneous ignition and/or oxidation of unreacted fuel and/or other species within cleanup chamber 56.

In some cases, heat from the oxidation chamber 52 may be sufficient to raise the temperature of the stream in conduit 63 above the adiabatic flame temperature of the fuel and air mixture entering chamber 52. This can be useful in some instances if the adiabatic flame temperature of the fuel and air mixture entering chamber 52 is below the desired operating temperature of reaction chamber 54. As a non-limiting, illustrative example of this, the oxidation chamber may be operating as a partial oxidation burner with a natural adiabatic flame temperature, absent of any other heat inputs, of 800° C. The clean-up chamber may be operating with a temperature of 1200° C. Sufficient thermal energy may be transferred into oxidation chamber 52 and/or conduit 63 from cleanup chamber 56 such that the temperature of the flow exiting conduit 63 may be raised to 1000° C., thereby maintaining reaction chamber 58 at 950° C., despite paths of heat transfer out of reaction chamber 54 such as thermal conduction through housing 70.

Additionally, in housing 70, water enters from a source of water through conduit 68. Flow of water within conduit 68 is controlled by pump 95. Use of a water pump can be useful in certain embodiments of the invention, since it allows the pressurization of the water conversion chamber 58 and other chambers fluidically connected to it, e.g., the anode compartment of the fuel cell, as discussed below. Such pressurization can provide a number of functions, for example, increasing the hydrogen generation rate of the system by increasing the oxygen partial pressure gradient across material 55, increasing the power output of the fuel cell system discussed below, purging water from passages within the fuel cell discussed below, storing extra hydrogen to be used during sudden load increases by the fuel cell, etc. In one embodiment, the pump may pressurize the water conversion chamber and all other chambers fluidically connected to it downstream of the pump, including the fuel cell. In some embodiments, this pressure will be at least about 0.2 psi (1 psi=6.89475 kPa), at least about 1 psi, at least about 5 psi, at least about 10 psi, at least about 50 psi, at least about 100 psi, at least about 150 psi, or at least about 200 psi, at least about 300 psi, at least about 400 psi, at least about 500 psi or more. Use of such a pump, in certain instances, can simplify control of the system, e.g., by controlling the speed of the pump as a function of the hydrogen output pressure in conduit 69 (which may be substantially the same as conduit 87, discussed below). As a non-limiting example, if the pressure drops below a certain set point, the pump speed can be raised until such time that the pressure rises back up to some other upper limit at which point the pump can slowed down again.

Within water conversion chamber 58, at least some of the water may be reacted to produce hydrogen gas and oxygen ions, e.g., via in situ electrolysis. The oxygen ions may pass through material 55 to react with fuel in reaction chamber 54.

Water and hydrogen exit water conversion chamber 58 and housing 70 through conduit 69, entering condenser 78. Condenser 78 may separate hydrogen from unreacted water that may still be present, e.g., by cooling the mixture to a temperature less than the boiling point of water (if condenser 78 is held at an increased pressure, the boiling point of water may not necessarily be at 100° C.). Water from condenser 78 can recirculate through conduit 79, reentering water conversion chamber 58 through conduit 68 via water reservoir 130. Condenser 78 may be a single unit or may comprise a plurality of components, e.g., radiator 132 and water knock-out tank 131. The amount of water within condenser 78 (e.g., within water knock-out tank 131) may be controlled, e.g., by level control 93, and cooling within condenser is achieved by cooling device 94, for example, a fan. In addition, flow of water within conduit 79 can be controlled through operation of controller 127, for example, a solenoid valve. The water can be driven, in some cases, by gaseous hydrogen pressure in condenser 78 (and/or by other chambers and conduits in fluid communication with condenser 78), which may be pressurized by pump 95. Hydrogen separated by condenser 78 may exit through conduit 77, polishing chamber 80, conduit 84, pressure reservoir 86, and conduit 87 to fuel cell 100. In some cases, a polishing chamber 80 may be used to methanate CO and/or $CO_2$ present within conduit 99 into $CH_4$ through reaction with $H_2$, e.g., as previously described. Water created during this process may also be removed, e.g., via a pressure reservoir, and optionally the water is recirculated. In addition, make-up water may enter water reservoir 130 through conduit 116, as discussed herein. As discussed above, residual water and/or a portion of the generated hydrogen may also be recirculated from pressure reservoir 86 back to conduit 68 via pump 129.

As shown in FIG. 15, common airflow device 76 controls the flow of air into both oxidation chamber 52, and cleanup chamber 56. The flow of air from common airflow device 76 is divided into conduits 62 and 66, which respectively enter oxidation chamber 52 and cleanup chamber 56. Flow through conduit 62 is monitored by flow indicator 81, while the flow through conduit 66 is monitored by flow indicator 82. In addition, the ratio of flows between conduit 62 and 66 can controlled by proportional valve 85, e.g., a flap valve. The control of proportional valve 85 can be controlled, for instance, depending on the measurements of flow indicator 83 (measuring fuel entry), as well as flow indicators 81 and 82. For instance, by monitoring the amount of fuel flowing through conduit 61, as indicated by flow indicator 83, the flow rate of common airflow device 76 may be controlled, to bring in a suitable amount of air and/or oxygen into housing 70 (e.g., into oxidation chamber 52, and cleanup chamber 56), for example, a stoichiometric amount of oxygen.

Hydrogen exiting condenser 78 may be used for any suitable purpose, for example, to be collected, or as shown in FIG. 15, to be used to produce electrical energy and water via oxidation, e.g., via a fuel cell, such as those described above. As shown in FIG. 15, fuel cell 100 is a proton exchange membrane fuel cell, which includes an anode compartment 101, a cathode compartment 102, and a cooling compartment 103. Fuel cell 100 is controlled by controller 105. Exhaust from anode compartment 101, is monitored through sensors such as pressure indicator 97 and controlled through actuators such as solenoid valve 98. The exhaust gas may be vented to the atmosphere, or as shown here, may be recirculated into oxidation chamber 52 via conduit 122, for example, if there is any unoxidized hydrogen that may be present.

Coolant that passes through cooling compartment 103 of fuel cell 100 may be expanded with expansion tank 107 (for example if the coolant expands due to an increase in temperature), before passing through heat exchanger 108, and the flow through cooling compartment 103 may be controlled by pump 109 that can recirculate the coolant back to cooling chamber 103. The output from cathode compartment 102 of fuel cell 100 passes into heat exchanger 110 via conduit 104. Within heat exchanger 110, the water produced from the oxidation of the hydrogen gas may be condensed and is collected and passed through conduit 111 into reservoir 112, monitored by level control 113. Reservoir 112 may be held at ambient pressure in some cases. From reservoir 112, water may be brought into reservoir 130, if necessary, for example, if level control 113 indicates that the amount of water within reservoir 12 is too high. The water may be brought into reservoir 130 via pump 115. Recapture of the water from the fuel cell in this way may be useful in minimizing the overall water use of the system. In addition, within heat exchanger 110, air may be used to cool the water, e.g., to cause the water to condense into a liquid. Air may be brought to heat exchanger 110 from conduit 114 using device 117 (e.g., a pump or a blower), and air filter 118 may be used to filter the incoming air. After heat exchange, dried air may be vented, e.g., through conduit 119, while the humidified, heated air may be recirculated back to cathode compartment 102 through conduit 121.

Another non-limiting example of a system of the invention is shown in FIG. 15. In this figure, a fuel such as propane in fuel source 51, controlled by fuel control valve 96, is directed through conduit 61 to oxidation chamber 52 contained within housing 70. An airflow device 76 also directs air into oxidation chamber 52 via conduit 62. The products from oxidation chamber 52 flow into reaction chamber 54, on one side of material 55, e.g., a membrane. In reaction chamber 54, additional oxidation of the fuel occurs, with oxygen being supplied through material 55 from water conversion chamber 58. The products from the reaction pass into cleanup chamber 56. Also entering cleanup chamber 56 is air from airflow device 76, controlled via valve 126. Cleanup chamber may be used to more fully oxidize any residual unoxidized fuel, oxidize CO to form $CO_2$, oxidize soot or other particulates that may have formed, or the like. Gases exiting cleanup chamber 56 then leave reaction 70 via conduit 67.

In addition, as is shown in FIG. 15, heat may be exchanged through the use of various heat exchangers. For instance, multi-path recuperator 133 may be used to exchange hear from two or more of oxidation chamber 52, conduit 62, cleanup chamber 56, conduit 67, or conduit 79. Similarly, recuperator 135 may be used to exchange heat between conduits 69 and 79.

Water enters water conversion chamber 58 within reactor 70 via conduit 79. The flow within conduit 79 may be controlled by controller 95, which may be, for instance, a pump. Within water conversion chamber 58, some of the water may be converted into hydrogen. The water and hydrogen exit water conversion chamber 58 and housing 70 through conduit 69, entering condenser 78. The water is cooled via cooling device 94 (e.g., a fan), and a portion of the water liquefies and exits via conduit 128 controlled by valve 127 entering reservoir 130. Water within reservoir 130 is controlled by controller 95 and enters conduit 79, as discussed above.

Gases, including water and hydrogen, exit condenser 78 via conduit 77 into polishing chamber 80. As shown in FIG. 15, polishing chamber 80 is shown contained within housing 70, although it is not necessary that it be contained within the housing. Within polishing chamber 80, CO and/or $H_2$ may be reacted, e.g., to form $CH_4$ or other species. For instance, a methanation reaction such as $CO+3H_2 \rightarrow CH_4+H_2O$ may be catalyzed within polishing chamber 80. Gases leaving polishing chamber 80 then pass via conduit 84 into vessel 86, which may be, for instance, a pressure reservoir or a condenser. Within vessel 86, hydrogen gas is separated from the water and leaves via conduit 87 (e.g., for use within a fuel cell, chemical reaction, purification, or the like), while water passes via conduit 88, controlled by controller 129 (e.g., a pump), for recirculation into conduit 79.

The following documents are incorporated herein by reference: International Patent Application No. PCT/US2005/035714, filed Oct. 5, 2005, entitled "Conducting Ceramics for Electrochemical Systems," by S. Rackey, et al., published as WO 2006/041854 on Apr. 20, 2006; and U.S. Provisional Patent Application Ser. No. 60/787,555, filed Mar. 30, 2006, entitled "Conducting Ceramics for Electrochemical Systems," by S. Rackey, et al.; U.S. Provisional Patent Application Ser. No. 60/787,555, filed Mar. 30, 2006, entitled "Conducting Ceramics for Electrochemical Systems," by Rackey, et al.; and U.S. Provisional Patent Application Ser. No. 60/899,865, filed Feb. 6, 2007, entitled "Architectures for Electrochemical Systems," by Rackey, et al. Also incorporated by reference are U.S. patent application Ser. No. 11/729,955, entitled "Conducting Ceramics for Electrochemical Systems" by Rackey, et al., filed Mar. 29, 2007, and U.S. Provisional Patent Application Ser. No. 61/275,699, filed Mar. 29, 2007, entitled "Architectures for Electrochemical Systems," by Boersma, et al. (formerly U.S. patent application Ser. No. 11/731,014).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system, comprising:
a source of fuel;
a source of water;
a housing;
an oxidation chamber in fluidic communication with the source of fuel and a source of oxidant, the oxidation chamber operative to produce an output product stream including oxidized fuel;
a reaction chamber downstream from and in fluidic communication with the oxidation chamber and configured to receive a single fuel input stream consisting of the output product stream including oxidized fuel from the oxidation chamber, the reaction chamber operative to produce a further output stream including further oxidized fuel;
a cleanup chamber downstream from and in fluidic communication with the reaction chamber and the source of oxidant, the cleanup chamber operative to further oxidize any unoxidized products present in the further output stream from the reaction chamber; and
a water conversion chamber, contained within but fluidically separate from the reaction chamber at least in part by a mixed ionically and electronically conductive material to supply ions to the reaction chamber for reaction within the reaction chamber to produce the further output stream, the water conversion chamber in fluidic communication with the source of water, the water conversion chamber operative to produce a hydrogen output product stream fluidically separate from the reaction chamber and the further output stream;
wherein water from the source of water enters the water conversion chamber through a water input port;
wherein the hydrogen output product stream exits the water conversion chamber through a hydrogen output port;
wherein each of the oxidation chamber, the reaction chamber, the water conversion chamber within the reaction chamber, and the cleanup chamber are contained within the housing;
wherein the hydrogen output product stream is substantially pure and free of contaminants;
wherein the cleanup chamber is configured to receive a single input stream from the reaction chamber consisting of the further output stream of the reaction chamber; and wherein the water conversion chamber, the water input port and the hydrogen output port are all disposed within the reaction chamber.

2. The system of claim 1, wherein the mixed ionically and electronically conductive material comprises a ceramic.

3. The system of claim 2, wherein the mixed ionically and electronically conductive material is substantially gas impermeable.

4. The system of claim 2, further comprising a porous substrate in physical contact with the mixed ionically and electronically conductive material.

5. The system of claim 2, wherein the material comprises YSZ.

6. The system of claim 2, wherein the material comprises YST.

7. The system of claim 2, wherein the material comprises YLST.

8. The system of claim 2, wherein the material comprises ScCeST.

9. The system of claim 2, wherein the mixed ionically and electronically conductive material comprises a first phase comprising a ceramic ionic conductor and a second phase comprising a ceramic electrical conductor.

10. The system of claim 9, wherein the first phase comprises YSZ.

11. The system of claim 9, wherein the first phase comprises zirconia.

12. The system of claim 11, wherein the zirconia is stabilized in a cubic structure using one or more dopants.

13. The system of claim 11, wherein the zirconia is stabilized using Y.

14. The system of claim 13, wherein Y is present in a mole ratio of between about 5 mol % and about 10 mol %.

15. The system of claim 11, wherein the zirconia is stabilized using Sc.

16. The system of claim 15, wherein Sc is present in a mole ratio of between about 5 mol % and about 15 mol %.

17. The system of claim 9, wherein the first phase comprises an oxide including at least cerium oxide and gadolinium oxide.

18. The system of claim 9, wherein the first phase comprises a La-ferrite material.

19. The system of claim 9, wherein the first phase comprises $Gd_2O_3$ doped with Ce.

20. The system of claim 9, wherein the first phase comprises a doped $LaFeO_3$.

21. The system of claim 20, wherein the doped LaFe03 is doped with one or more of Sr, Ca, Ga, or Fe.

22. The system of claim 9, wherein the second phase comprises a LST material.

23. The system of claim 9, wherein the second phase comprises a YST material.

24. The system of claim 9, wherein the second phase comprises a LCC material.

25. The system of claim 9, wherein the second phase comprises a YLST material.

26. The system of claim 9, wherein the second phase comprises a ScCeST material.

27. The system of claim 9, wherein the first phase is interconnected throughout the mixed ionically and electronically conductive material such that the material is ionically conductive, and the second phase is interconnected throughout the mixed ionically and electronically conductive material such that the material is electronically conductive.

28. The system of claim 2, further comprising at least one electrode positioned adjacent the mixed ionically and electronically conductive material.

29. The system of claim 28, wherein the electrode is porous.

30. The system of claim 28, wherein the electrode has a composition similar to the composition of the mixed ionically and electronically conductive material.

31. The system of claim 28, comprising at least two electrodes positioned adjacent the mixed ionically and electronically conductive material.

32. The system of claim 1, further comprising a polishing chamber in fluidic communication with the water conversion chamber.

33. The system of claim 32, wherein the polishing chamber comprises a catalyst for catalyzing a reaction of CO and $H_2$ to $CH_4$ and $H_2O$.

34. The system of claim 33, wherein the polishing chamber comprises ruthenium.

35. The system of claim 33, wherein the polishing chamber comprises platinum.

36. The system of claim 1, further comprising a fuel cell in fluidic communication with the water conversion chamber.

37. The system of claim 36, wherein the fuel cell is a solid oxide fuel cell.

38. The system of claim 1, further comprising a power-generating device, able to produce power by consuming $H_2$, in fluidic communication with the water conversion chamber.

39. The system of claim 1, further comprising a hydrogen collection chamber in fluidic communication with the water conversion chamber.

40. The system of claim 39, wherein the hydrogen collection chamber is in fluidic communication with a water inlet to the water conversion chamber via a gas conduit.

41. The system of claim 40, further comprising a gas pump able to pump gas within the gas conduit.

42. The system of claim 1, wherein the source of fuel comprises a carbonaceous fuel.

43. The system of claim 1, wherein the source of fuel comprises an oxidizable fuel.

44. The system of claim 1, wherein the source of fuel comprises a gasified fuel.

45. The system of claim 44, wherein the source of fuel comprises gasified coal.

46. The system of claim 44, wherein the source of fuel comprises a gasified hydrocarbon.

47. The system of claim 1, further comprising a fluidic connection such that at least a portion of hydrogen generated in the water conversion chamber is captured downstream of the water conversion chamber and mixed with the water upstream of the water conversion chamber.

48. The system of claim 47, wherein the fluidic connection comprises a pump.

49. The system of claim 1, wherein the source of oxidant provides an oxidant consisting of air.

* * * * *